United States Patent [19]

Hamasaki et al.

[11] Patent Number: 5,717,820
[45] Date of Patent: Feb. 10, 1998

[54] SPEECH RECOGNITION METHOD AND APPARATUS WITH AUTOMATIC PARAMETER SELECTION BASED ON HARDWARE RUNNING ENVIRONMENT

[75] Inventors: Ryosuke Hamasaki; Shinta Kimura, both of Kawasaki, Japan

[73] Assignee: Fujitsu Limited, Kawasaki, Japan

[21] Appl. No.: 399,631

[22] Filed: Mar. 7, 1995

[30] Foreign Application Priority Data

Mar. 10, 1994 [JP] Japan ................... 6-039428

[51] Int. Cl.⁶ ........................ G10L 5/06
[52] U.S. Cl. ........................ 395/2.4
[58] Field of Search ................ 395/2.4, 2.84, 395/2.6

[56] References Cited

U.S. PATENT DOCUMENTS

| | | | |
|---|---|---|---|
| 4,713,778 | 12/1987 | Baker | 364/513.5 |
| 4,718,092 | 1/1988 | Klovstad | 381/43 |
| 4,718,093 | 1/1988 | Brown | 381/43 |
| 4,937,869 | 6/1990 | Iwahashi et al. | 381/43 |
| 4,942,602 | 7/1990 | Baker, Jr. et al. | 379/212 |
| 4,974,191 | 11/1990 | Amirghodsi et al. | 364/900 |
| 5,375,173 | 12/1994 | Sanada et al. | 381/43 |

*Primary Examiner*—Allen R. MacDonald
*Assistant Examiner*—Robert C. Mattson
*Attorney, Agent, or Firm*—Staas & Halsey

[57] ABSTRACT

A speech recognition method and apparatus enable the use of the same recognition software for speaker dependent recognition under various running environments such as different computers. The speech recognition method operates in the form of computer software to detect at least one running environment of hardware. The hardware running environment may include processing speed of a computer. Recognition parameters are then determined which correspond to the detected running environment. Next, the speech recognition method converts an input analog speech signal into a digital speech signal. The digital speech signal, in the form of extracted feature data, is then compared with digital feature data in a dictionary. The speech is then recognized in response to a match of the data.

24 Claims, 24 Drawing Sheets

FIG. 8

| RUNNING ENVIRONMENT | | SAMPLING FREQUENCY | QAUNTIZATION BIT NO. | SHIFT POINT NO. | ANALYZING POINT NO. | CHANNEL NO. |
|---|---|---|---|---|---|---|
| CPU TYPE | (HIGH PERFORMANCE) | HIGH SAMPLING | — | SMALL | LARGE | LARGE |
| | (LOW PERFORMANCE) | LOW SAMPLING | — | LARGE | SMALL | SMALL |
| CLOCK FREQUENCY | (HIGH) | HIGH SAMPLING | — | SMALL | LARGE | LARGE |
| | (LOW) | LOW SAMPLING | — | LARGE | SMALL | SMALL |
| CPU LOAD | (LARGE) | LOW SAMPLING | — | LARGE | SMALL | SMALL |
| | (SMALL) | HIGH SAMPLING | — | SMALL | LARGE | LARGE |
| MEMORY CAPACITY | (LARGE) | — | — | — | — | — |
| | (SMALL) WHEN SWAPPING | LOW SAMPLING | — | LARGE | SMALL | SMALL |
| STATE OF MEMORY IN USE | (LARGE) WHEN SWAPPING | LOW SAMPLING | — | LARGE | SMALL | SMALL |
| | (SMALL) | — | — | — | — | — |
| SAMPLING FREQUENCY OF A/D | (LARGE) | DECIMATION POSSIBLE | — | LARGE | LARGE | LARGE |
| | (SMALL) | A/D DEPENDENT | — | SMALL | SMALL | SMALL |
| QUANTIZATION BIT NO. OF A/D | (LARGE) | — | BIT NO. REDUCEABLE | — | — | — |
| | (SMALL) | — | A/D DEPENDENT | — | — | — |

FIG. 9

| RUNNING ENVIRONMENT | | I | II | III | IV | V |
|---|---|---|---|---|---|---|
| CPU TYPE | A | 16 | — | 65% | 512 | 16 |
|  | B | 12 | — | 80% | 256 | 12 |
|  | C | 8 | — | 100% | 128 | 8 |
| CLOCK FREQUENCY (MHz) | 33 | 16 | — | 65% | 512 | 16 |
|  | 25 | 12 | — | 80% | 256 | 12 |
|  | 16 | 8 | — | 100% | 128 | 8 |
| CPU LOAD | 80% | 8 | — | 100% | 128 | 8 |
|  | 60% | 12 | — | 80% | 256 | 12 |
|  | 40% | 16 | — | 65% | 512 | 16 |
| MEMORY CAPACITY (MB) | 10 | 16 | — | 65% | 512 | 16 |
|  | 6 | 12 | — | 80% | 256 | 12 |
|  | 4 | 8 | — | 100% | 128 | 8 |

FIG. 10

| RUNNING ENVIRONMENT | | I | II | III | IV | V |
|---|---|---|---|---|---|---|
| STATE OF MEMORY IN USE | 80% | 8 | — | 100% | 128 | 8 |
| | 60% | 12 | — | 80% | 256 | 12 |
| | 40% | 16 | — | 65% | 512 | 16 |
| SAMPLING FREQUENCY OF A/D (kHz) | 16 | 16,12,8 | — | 100% | 512 | 16 |
| | 12 | 12,8 | — | 80% | 256 | 12 |
| | 8 | 8 | — | 65% | 128 | 8 |
| QUANTIZATION BIT NO. OF A/D | 16 | — | 16,12,8 | — | — | — |
| | 12 | — | 12,8 | — | — | — |
| | 8 | — | 8 | — | — | — |

FIG. 11

| RUNNING ENVIRONMENT | | I | II | III | IV | V |
|---|---|---|---|---|---|---|
| CPU TYPE | B | 12 | – | 205 | 256 | 12 |
| CLOCK FREQUENCY | 25 | 12 | – | 205 | 256 | 12 |
| CPU LOAD | 40% | 16 | – | 166 | 512 | 16 |
| MEMORY CAPACITY (MB) | 6 | 12 | – | 205 | 256 | 12 |
| STATE OF MEMORY IN USE | 60% | 12 | – | 205 | 256 | 12 |
| SAMPLING FREQUENCY OF A/D | 16 | 16,12,8 | 16,12,8 | 256 | 512 | 16 |
| QUANTIZATION BIT NO. OF A/D | 16 | – | 16,12,8 | – | – | – |

FIG. 12

| RUNNING ENVIRONMENT | | I | II | III | IV | V |
|---|---|---|---|---|---|---|
| CPU TYPE | A | 16 | — | 333 | 512 | 16 |
| CLOCK FREQUENCY | 33 | 16 | — | 333 | 512 | 16 |
| CPU LOAD | 60% | 12 | — | 205 | 256 | 12 |
| MEMORY CAPACITY (MB) | 10 | 16 | — | 333 | 512 | 16 |
| STATE OF MEMORY IN USE | 40% | 16 | — | 333 | 512 | 16 |
| SAMPLING FREQUENCY OF A/D | 16 | 16,12,8 | 16,12,8 | — | — | — |
| QUANTIZATION BIT NO. OF A/D | 16 | — | — | — | — | — |

F I G. 13

| RUNNING ENVIRONMENT | C | I | II | III | IV | V |
|---|---|---|---|---|---|---|
| CPU TYPE | 16 | 8 | — | 128 | 128 | 8 |
| CLOCK FREQUENCY | 60% | 8 | — | 128 | 128 | 8 |
| CPU LOAD | 4 | 12 | — | 205 | 256 | 8 |
| MEMORY CAPACITY (MB) | 80% | 8 | — | 128 | 128 | 8 |
| STATE OF MEMORY IN USE | 12 | 8 | — | 128 | 128 | 8 |
| SAMPLING FREQUENCY OF A/D | 12 | 12, 8 | 12, 8 | — | — | — |
| QUANTIZATION BIT NO. OF A/D | | — | | — | — | — |

SPEECH RECOGNITION METHOD AND APPARATUS WITH AUTOMATIC PARAMETER SELECTION BASED ON HARDWARE RUNNING ENVIRONMENT

BACKGROUND OF THE INVENTION

The present invention generally relates to speech recognition methods and apparatuses, and more particularly to a speech recognition method which enables the use of the same recognition software under various running environments such as different performances of computers, and to a speech recognition apparatus which uses such a speech recognition method.

A speech recognition apparatus extracts feature data of an input speech signal, and matches the extracted feature data with feature data registered in a dictionary or lexicon. The input speech signal is recognized based on the result of this matching process.

FIG. 1 shows an example of a conventional speech recognition apparatus. In FIG. 1, a dictionary 1 manages feature data of speech signals. A speech recognition unit 6 includes a speech input means 2, a speech analyzing means 3, a speech matching means 4, and a recognition result output means 5.

The speech input means 2 inputs a speech signal which is to be recognized, and converts this speech signal into a digital signal. The speech analyzing means 3 analyzes the digital signal, and extracts feature data of the speech signal. The speech matching means 4 matches the extracted feature data and the feature data registered in the dictionary 1, so as to recognize the speech signal. The recognition result output means 5 outputs the recognition result of the speech matching means 4.

When making speaker dependent speech recognition, the feature data of the speech signals related to a specific speaker are registered in the dictionary 1. On the other hand, the feature data of the speech signals provided by a particular manufacturer or the like are registered in the dictionary 1 when making a speaker independent speech recognition.

The speech recognition unit 6 is made up of a computer. The speech input means 2, the speech analyzing means 3, the speech matching means 4, and the recognition result output means 5 are realized by a recognition software, that is, a recognition program which runs on this computer.

However, computers have different hardware performances, and the processing speed of the computer depends on its hardware performance. Hence, in order to ensure that the recognition process is carried out within a tolerable time, the recognition program must be made to suit the hardware performance of each computer, that is, to suit the running environment of the recognition software.

Recently, the hardware performances of personal computers have improved considerably, and there are demands to realize a speech recognition apparatus using the personal computer. However, since the hardware performance of the personal computer depends on each individual type of personal computer, there was a problem in that the same recognition program cannot be used on all types of the personal computers.

In other words, a personal computer having a relatively low processing speed cannot execute a complex speech recognition program within a short time, and in order to carry out the recognition process within the tolerable time, it is necessary to manually adjust the parameters of the recognition program and redesign the recognition program for this particular type of personal computer. On the other hand, a personal computer having a relatively high processing speed can execute a complex speech recognition program within a short time, and it is possible to manually adjust the parameters and redesign the recognition program for this particular type of personal computer so that a more accurate speech recognition may be made.

Accordingly, it was conventionally necessary to prepare a recognition program to suit each type of personal computer, that is, to suit each running environment, by guessing the possible running environments. But it was both troublesome and expensive to prepare recognition programs for the various running environments.

SUMMARY OF THE INVENTION

Accordingly, it is a general object of the present invention to provide a novel and useful speech recognition method and apparatus in which the problems described above are eliminated.

Another and more specific object of the present invention is to provide a speech recognition method which carries out a speech recognition process on an input speech signal based on recognition parameters using recognition software, comprising the steps of (a) detecting at least one running environment provided by hardware which is to run the recognition software, (b) determining recognition parameters depending on the running environment detected by the step (a), and (c) carrying out the speech recognition process on the input speech signal based on the recognition parameters determined by the step (b) using the recognition software. According to the speech recognition method of the present invention, it is possible to carry out the speech recognition process by flexibly modifying the recognition parameters used for the speech recognition depending on the running environment of the recognition software provided by the hardware of the computer which runs the recognition software. For this reason, it is possible to use the same recognition software among different types of computers having different performances, and realize an optimum speech recognition on each type of computer using the same recognition software.

Still another object of the present invention is to provide a speech recognition apparatus which carries out a speech recognition process on an input speech signal based on recognition parameters using a recognition software, comprising detecting means for detecting at least one running environment provided by hardware which is to run the recognition software, determining means, coupled to the detecting means, for determining recognition parameters depending on the running environment detected by the detecting means, and matching means, coupled to the determining means, for carrying out the speech recognition process on the input speech signal based on the recognition parameters determined by the determining means using the recognition software. According to the speech recognition apparatus of the present invention, it is possible to carry out the speech recognition process by flexibly modifying the recognition parameters used for the speech recognition depending on the running environment of the recognition software provided by the hardware of the computer which runs the recognition software. For this reason, it is possible to use the same recognition software among different types of computers having different performances, and realize an optimum speech recognition on each type of computer using the same recognition software.

A further object of the present invention is to provide a storage unit adapted for use on a speech recognition apparatus which carries out a speech recognition process on an input speech signal based on recognition parameters using a recognition software, where the speech recognition apparatus comprises detecting means for detecting at least one running environment provided by hardware which is to run the recognition software, determining means, coupled to the detecting means, for determining recognition parameters depending on the running environment detected by the detecting means, and matching means, coupled to the determining means, for carrying out the speech recognition process on the input speech signal based on the recognition parameters determined by the determining means using the recognition software, and the storage unit comprises values of running environments defined as running environment values, values of recognition parameters defined as recognition parameter values, and a conversion table managing corresponding relationships of each of the running environment values and each of the recognition parameter values, so that the determining means determines the recognition parameters depending on the running environment detected by the detecting means by referring to the conversion table. According to the storage unit of the present invention, it is possible to carry out the speech recognition process by flexibly modifying the recognition parameters used for the speech recognition depending on the running environment of the recognition software provided by the hardware of the computer which runs the recognition software. For this reason, it is possible to use the same recognition software among different types of computers having different performances, and realize an optimum speech recognition on each type of computer using the same recognition software.

Other objects and further features of the present invention will be apparent from the following detailed description when read in conjunction with the accompanying drawings.

BRIEF DESCRIPTION OF THE DRAWINGS

FIG. 8 is a diagram for explaining the relationship of the running environment and the recognition parameters;

FIG. 9 is a diagram showing a part of an embodiment of a conversion table which manages the corresponding relationships of the running environment values and the recognition parameter values;

FIG. 10 is a diagram showing the remaining part of the embodiment of the conversion table which manages the corresponding relationships of the running environment values and the recognition parameter values;

FIG. 11 is a diagram showing the recognition parameter values read from the conversion table shown in FIGS. 9 and 10;

FIG. 12 is a diagram showing the recognition parameter values read from the conversion table shown in FIGS. 9 and 10;

FIG. 13 is a diagram showing the recognition parameter values read from the conversion table shown in FIGS. 9 and 10;

DESCRIPTION OF THE PREFERRED EMBODIMENTS

First, a description will be given of the operating principle of one aspect of the present invention, by referring to FIG. 2.

Figure 1:
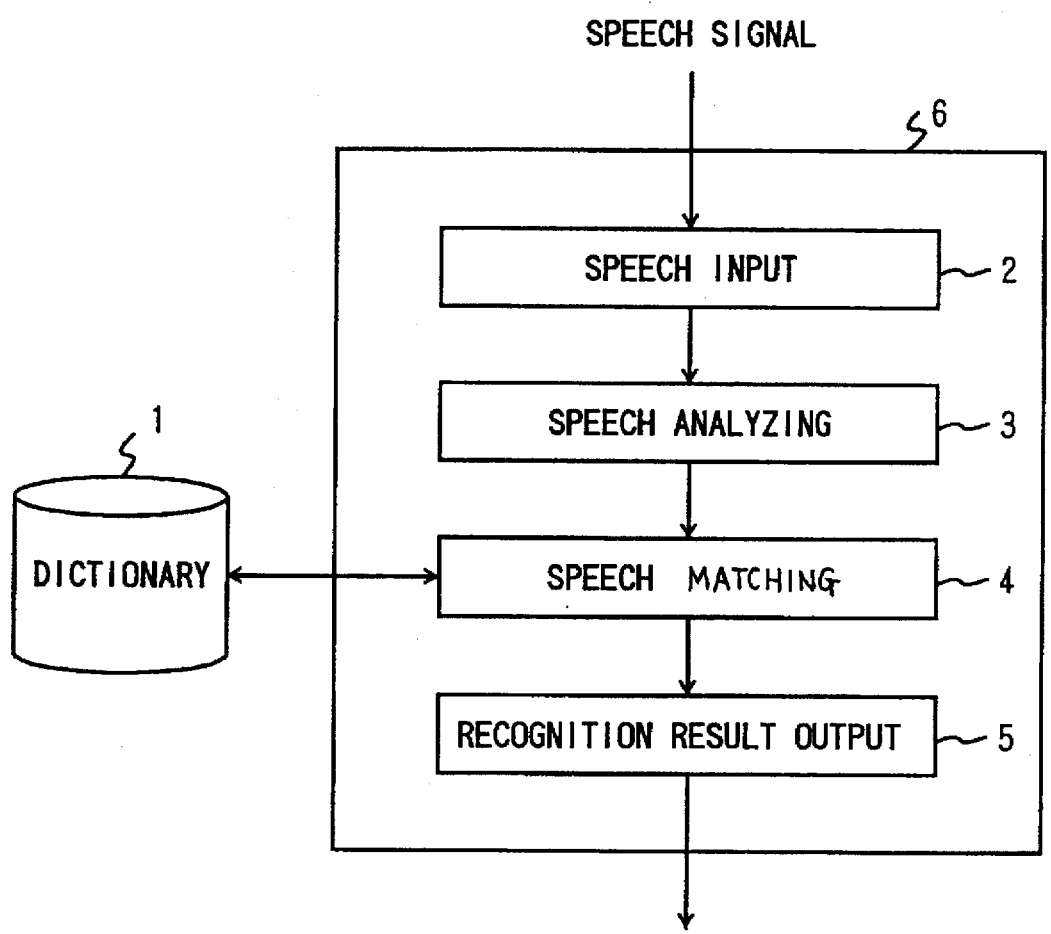
FIG. 1 is a system block diagram showing an example of a conventional speech recognition apparatus.
Figure 2:
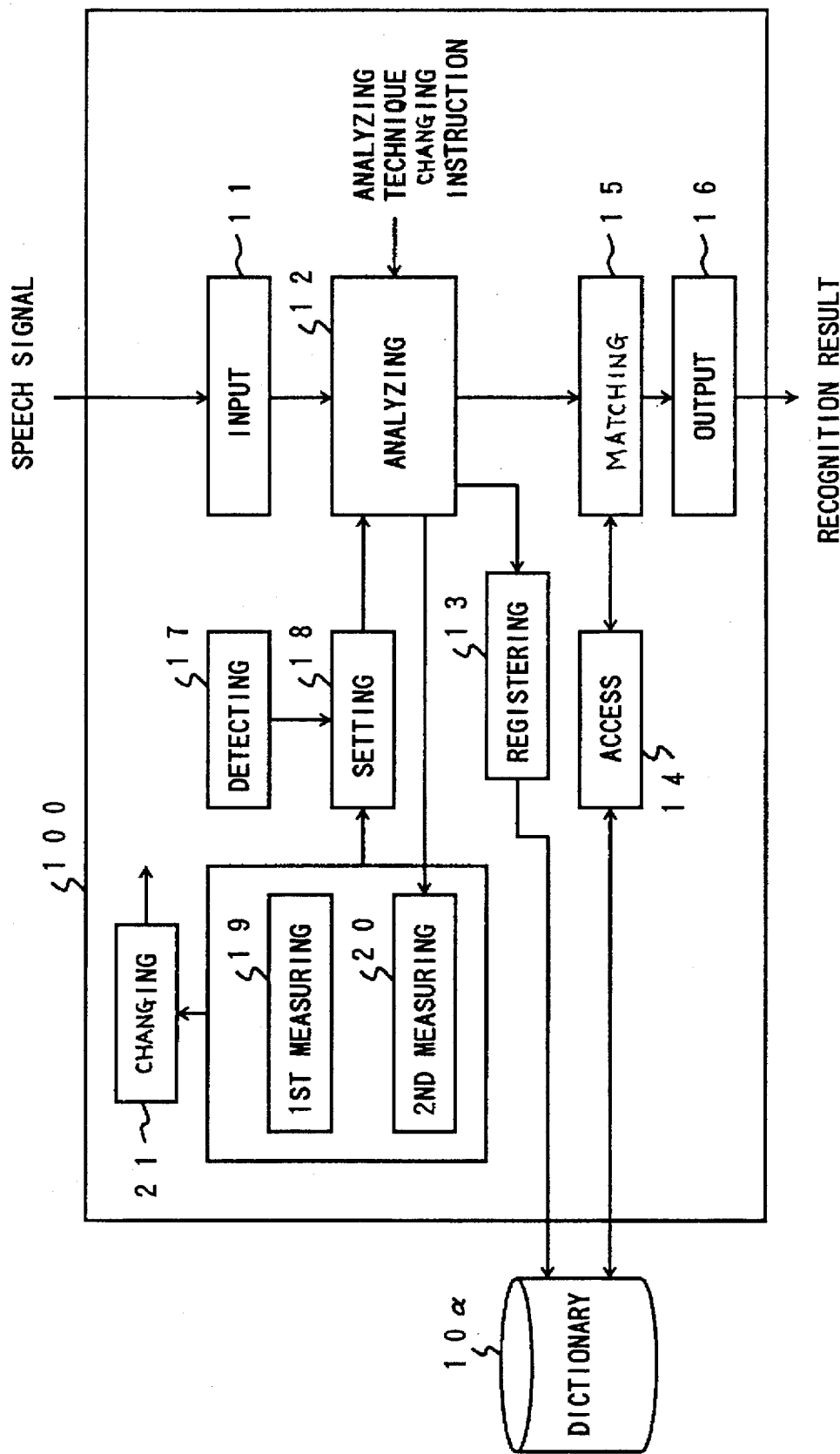
FIG. 2 is a system block diagram for explaining the operating principle of one aspect of the present invention.

In FIG. 2, a computer 100 is coupled to a dictionary or lexicon 10a, and forms a speech recognition apparatus. Recognition software, that is, a recognition program, runs on this computer 100. The speech recognition apparatus itself has a function of registering data in the dictionary 10a.

The computer 100 includes an input means 11, an analyzing means 12, a registering means 13, an access means 14, a matching means 15, an output means 16, a detecting means 17, a setting means 18, a first measuring means 19, a second measuring means 20, and a changing means 21.

The dictionary 10a is developed in a secondary storage unit of the computer 100, and manages the feature data of the speech signals. The input means 11 converts an input speech signal into a digital signal. The analyzing means 12 analyzes the digital signal from the input means 11 depending on recognition parameters which are set, so as to extract the feature data of the input speech signal.

The registering means 13 registers the feature data extracted by the analyzing means 12 in the dictionary 10a. The access means 14 carries out an access process to the dictionary 10a. The matching means 15 carries out a matching process with respect to the input speech signal. The output means 16 outputs a recognition result obtained from the matching means 15.

The detecting means 17 detects a running environment of the recognition software, which running environment is determined by hardware of the computer 100. For example, the setting means includes a conversion table that manages the corresponding relationships of running environment values and recognition parameter values, and the recognition parameters that are determined based on this conversion table are set in the analyzing means 12.

The first measuring means 19 starts a performance measuring program such as a benchmark program and checks the CPU performance by measuring the running time or processing time. The second measuring means 20 checks the CPU performance by measuring the running time or processing time required to extract the feature data of the speech signal. The changing means 21 changes the analyzing technique used in the analyzing means 12 in response to an analyzing technique changing instruction.

When the detecting means 17 detects the running environment provided by the hardware of the computer 100, the setting means 18 determines the recognition parameters for use in the speech recognition depending on the detected running environment. The setting means 18 also sets the determined recognition parameters in the analyzing means 12.

For example, if the CPU performance is detected as being high when the analyzing means 12 extracts the feature data using the Fast Fourier Transform (FFT) analyzing technique, the recognition parameters for use in the speech recognition are determined depending on the detected running environment and set in the analyzing means 12. That is, the number of feature pattern channels (hereinafter referred to as the feature pattern channel number or, simply, the channel number) are set relatively large, for example, when the CPU performance is detected as being high. The feature pattern channel number refers to the number of channels used to represent the feature pattern per frame, as will be described later.

After the recognition parameters for use by the analyzing means 12 are set, the registering means 13 first registers the feature data of the input speech signal extracted by the analyzing means 12 in the dictionary 10a. Then, the matching means 15 starts the recognition process by carrying out a matching process to match the feature data extracted by the analyzing means 12 and the feature data (or dictionary data) registered in the dictionary 10a. The recognition process with respect to the input speech signal is carried out by specifying the feature data that is registered in the dictionary 10a and most closely resembles the feature data of the input speech. The speech signal is recognized from the specified feature data and is output from the output means 16 as the recognition result.

When carrying out such a process, the setting means 18 may determine the recognition parameters while taking into consideration the measured results of the first and second measuring means 19 and 20. In addition, the changing means 21 may change the analyzing technique used in the analyzing means 12 depending on the measured results of the first and second measuring means 19 and 20. For example, when the CPU performance is detected as being high, the analyzing technique used in the analyzing means 12 is changed from the FFT analyzing technique to a Linear Prediction Coding (LPC) analyzing technique which has a larger load but a higher accuracy, depending on the measured results of the first and second measuring means 19 and 20. When changing the analyzing technique, the feature data in the dictionary 10a are also restructured.

Figure 3:
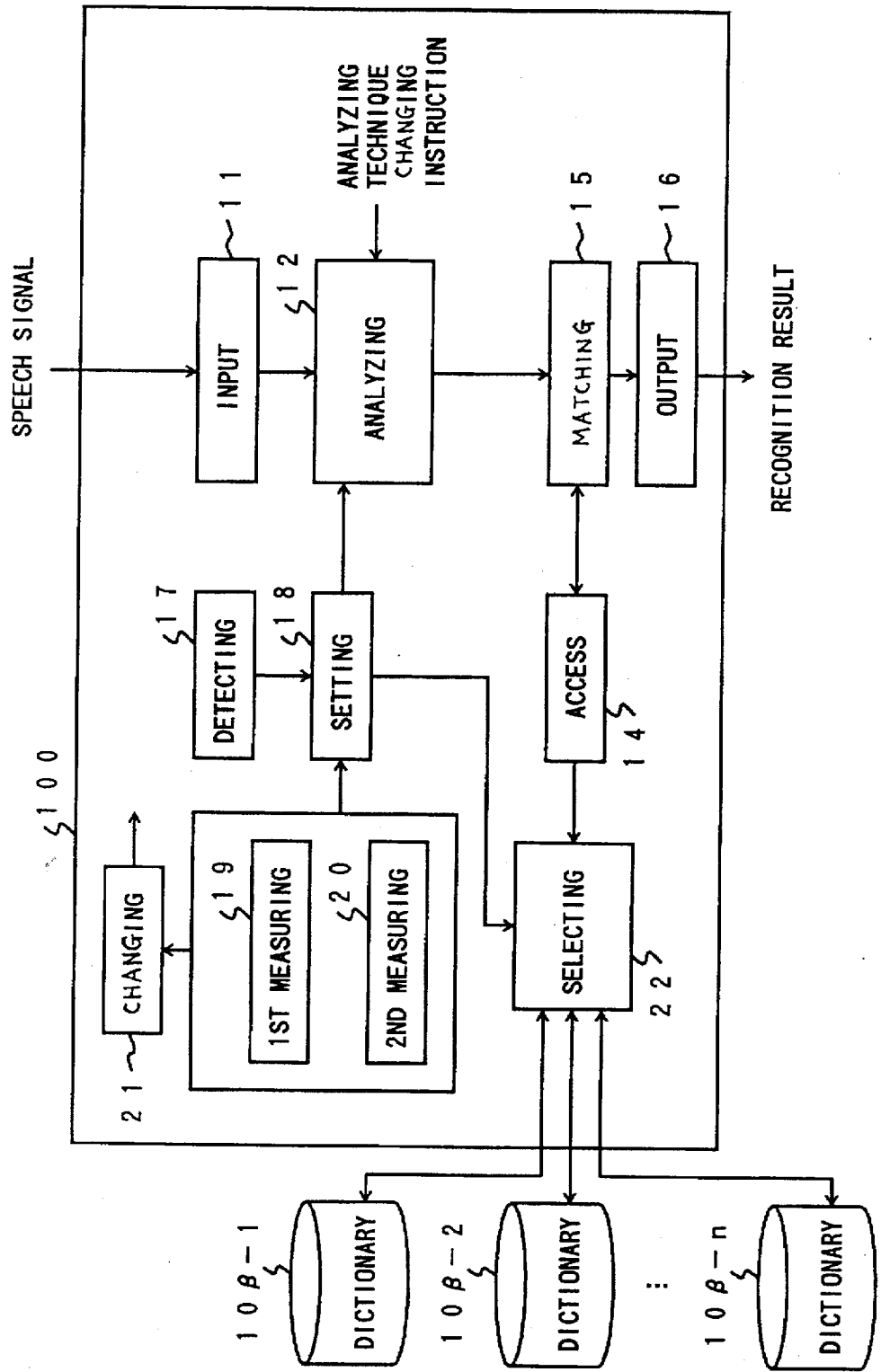
FIG. 3 is a system block diagram for explaining the operating principle of another aspect of the present invention.

Next, a description will be given of the operating principle of another aspect of the present invention, by referring to FIG. 3. In FIG. 3, those parts which are the same as those corresponding parts in FIG. 2 are designated by the same reference numerals, and a description thereof will be omitted.

In FIG. 3, the computer 100 does not have a registering means 13, but has a selecting means 22. In addition, a plurality of dictionaries 10β-i are coupled to the computer 100, where i=1, ..., n.

The dictionaries 10β-i are developed in the secondary storage unit of the computer 100, and manage the feature data of the speech signals which are made depending on different recognition parameters. The selecting means 22 selects from the dictionaries 10β-i a dictionary 10β-i that is indicated by the recognition parameters set by the setting means 18.

When the detecting means 17 detects the running environment provided by the hardware of the computer 100, the setting means 18 determines the recognition parameters for use in the speech recognition depending on the detected running environment, and sets the determined recognition parameters in the analyzing means 12.

For example, if the CPU performance is detected as being high when the analyzing means 12 extracts the feature data using the FFT analyzing technique, the recognition parameters for use in the speech recognition are determined depending on the detected running environment and set in the analyzing means 12. That is, the feature pattern channel number are set relatively large, for example, when the CPU performance is detected as being high.

After the recognition parameters for use by the analyzing means 12 are set, the selecting means selects the dictionary 10β-i that is indicated by the recognition parameters set by the setting means 18. Then, the matching means 15 starts the recognition process by carrying out a matching process to match the feature data extracted by the analyzing means 12 and the feature data (or dictionary data) registered in the dictionary 10β-i that is selected by the selecting means 22. The recognition process with respect to the input speech signal is carried out by specifying the feature data that is registered in the selected dictionary 10β-i and most closely resembles the feature data of the input speech. The speech signal is recognized from the specified feature data and is output from the output means 16 as the recognition result.

When carrying out such a process, the setting means 18 may determine the recognition parameters while taking into consideration the measured results of the first and second measuring means 19 and 20. In addition, the changing means 21 may change the analyzing technique used in the analyzing means 12 depending on the measured results of the first and second measuring means 19 and 20. For example, when the CPU performance is detected as being high, the analyzing technique used in the analyzing means 12 is changed from the FFT analyzing technique to the LPC analyzing technique which has a larger load but a higher accuracy, depending on the measured results of the first and second measuring means 19 and 20. When changing the analyzing technique, the feature data in the dictionary 10β-i are also restructured.

Therefore, according to the present invention, the recognition process with respect to the speech signal is made by flexibly modifying the recognition parameters for use in the speech recognition depending on the running environment provided by the hardware of the computer 100 which forms the speech recognition apparatus. For this reason, it is possible to realize an optimum speech recognition process on each type of computer 100 using the same recognition software.

Next, a description will be given of a first embodiment of the speech recognition apparatus according to the present invention. This first embodiment uses the operating principle of the first aspect of the present invention described above in conjunction with FIG. 2.

Figure 4:
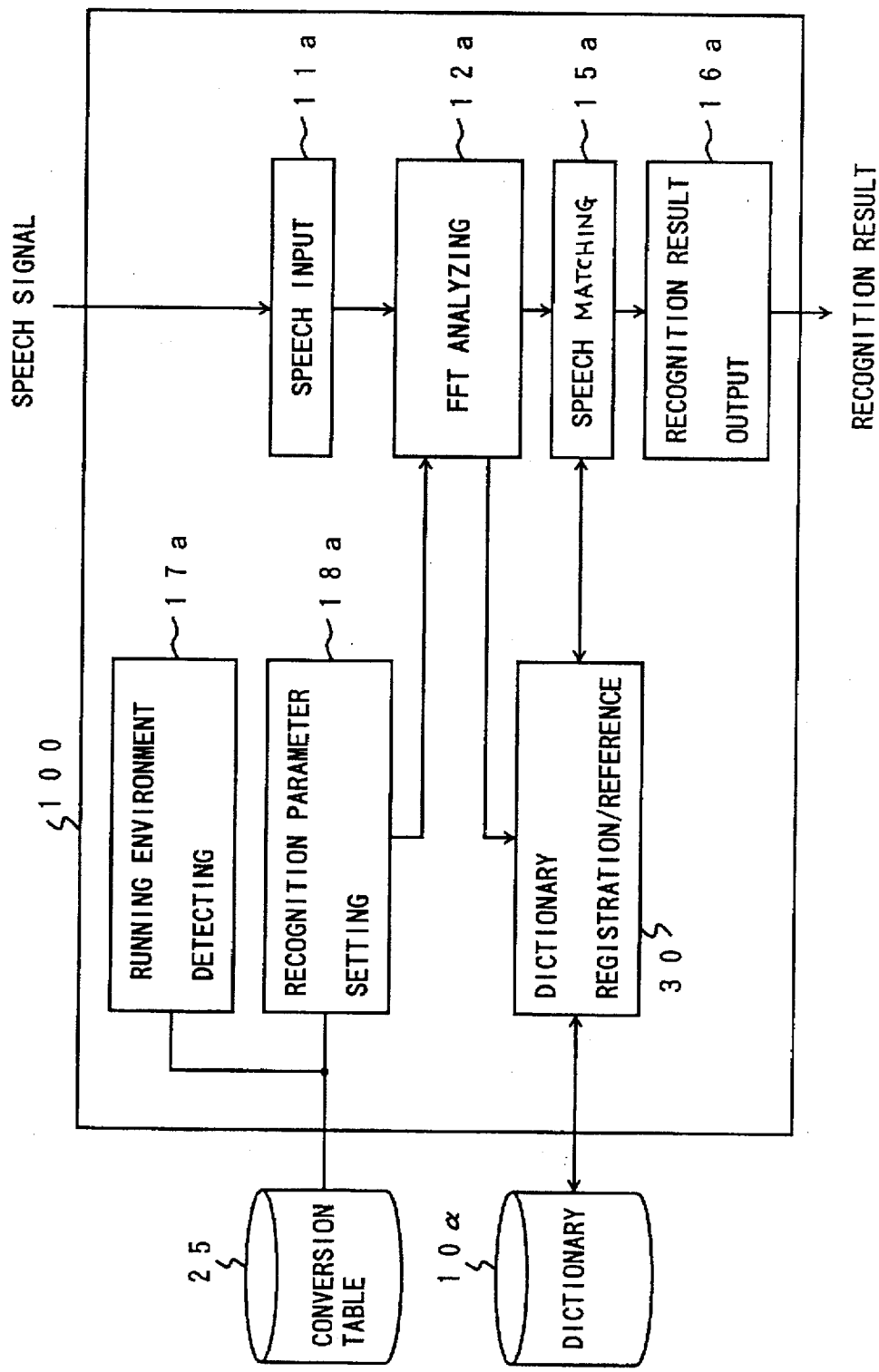
FIG. 4 is a system block diagram showing a first embodiment of a speech recognition apparatus according to the present invention.

FIG. 4 shows the first embodiment, and in FIG. 4, those parts which are the same as those corresponding parts in FIG. 2 are designated by the same reference numerals.

In FIG. 4, a speech input means 11a corresponds to the input means 11 shown in FIG. 2. The speech input means 11a converts the input speech signal into the digital signal using a predetermined sampling frequency and quantization bit number of an analog-to-digital (A/D) converter (not shown) that is provided within the speech input means 11a. Hence, a discrete speech signal limited of the frequency band and dynamic range is obtained from the speech input means 11a.

A FFT analyzing means 12a corresponds to the analyzing means 12 shown in FIG. 2. The FFT analyzing means 12a extracts the feature data of the input speech signal by making the FFT analysis directly with respect to the speech signal obtained from the speech input means 11a, by making the FFT analysis after carrying out a down sampling process or the like. The function of carrying out the down sampling process may be given to the speech input means 11a. In addition, the function of carrying out a level down process with respect to the quantization bit number may also be given to the speech input means 11a. The FFT analyzing means 12a does not extract the feature data by using analysis values of the FFT analysis as they are. Instead, the FFT analyzing means 12a extracts the feature data by integrating the analysis values. For this reason, to be more accurate, the FFT analyzing means 12a perhaps should be referred to as an analyzing means using FFT.

A speech matching means 15a, a recognition result output means 16a, a running environment detecting means 17a, and a recognition parameter setting means 18a respectively correspond to the matching means 15, the output means 16, the detecting means 17 and the setting means 18 shown in FIG. 2. A dictionary registration/reference means 30 corresponds to the registering means 13 and the access means 14 shown in FIG. 2.

A conversion table 25 manages the corresponding relationships of running environment values and recognition parameter values which will be described later for use by the recognition parameter setting means 18a. For example, this conversion table 25 is coupled externally to the computer 100 in FIG. 4, however, this conversion table 25 may be stored in an internal memory of the computer 100. In addition, a storage unit which stores the contents of the dictionary 10a may also store the contents of the conversion table 25. On the other hand, the storage unit which stores the contents of the conversion table 25 may also store the recognition software, that is, the recognition program. Of course, if the access speed to the conversion table 25 and/or the dictionary 10a is relatively slow, it is possible to once transfer the contents of the conversion table 25 and/or the dictionary 10a into the internal memory of the computer 100 by a known means.

The running environment detecting means 17a detects the running environment provided by the hardware of the computer 100. The recognition parameter setting means 18a determines the recognition parameters that conform to the running environment detected by the running environment detecting means 17a. The recognition parameter setting means 18a sets the determined recognition parameters in the FFT analyzing means 12a.

Figure 5:
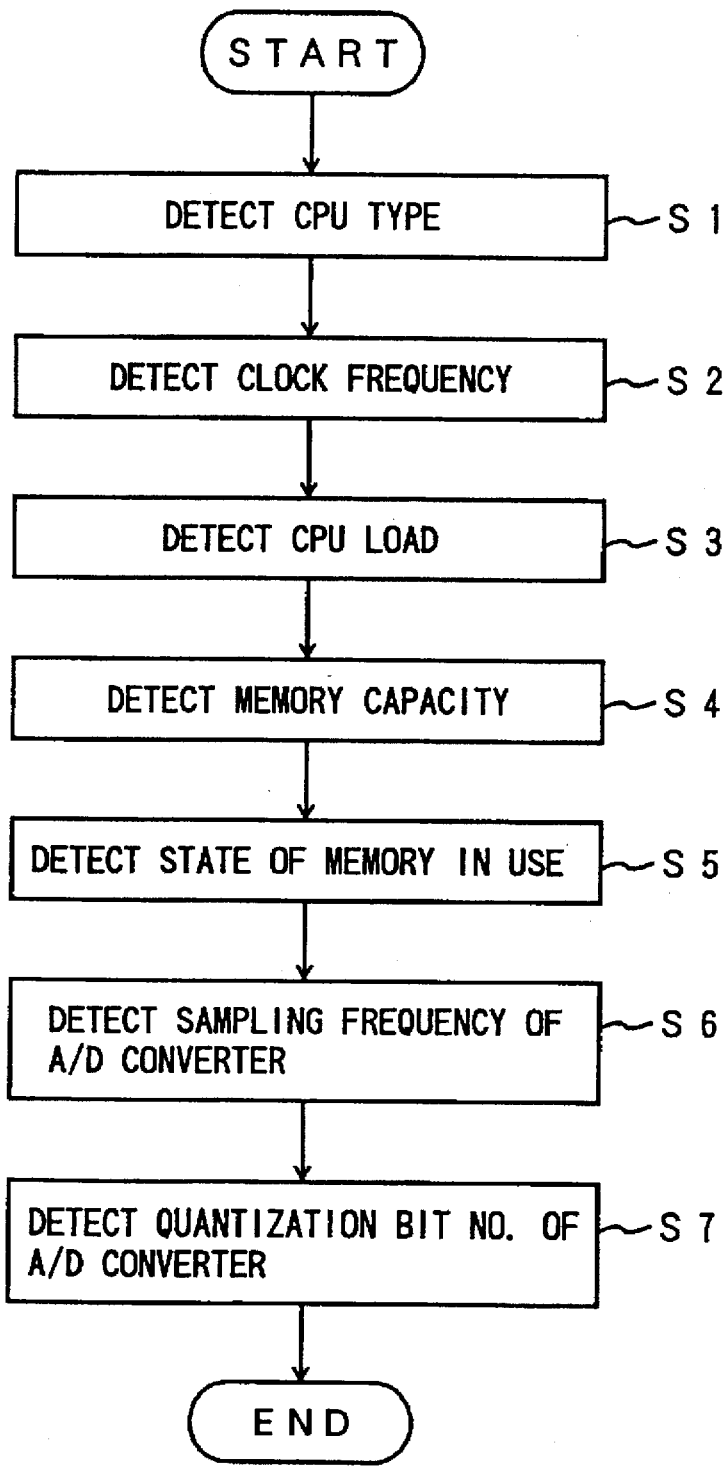
FIG. 5 is a flow chart showing an embodiment of the operation of a running environment detecting means of the first embodiment.

FIG. 5 shows an embodiment of the operation of the running environment detecting means 17a. In FIG. 5, a step S1 detects the type of CPU, such as the model of the CPU. For example, the CPU model 8086, 80286, 80386, 80486 or the like manufactured by Intel is detected in the step S1, because the processing speed differs among such CPUs.

A step S2 detects the clock frequency. The clock frequency is detected because the processing speed becomes higher as the clock frequency becomes higher.

A step S3 detects the CPU load. If the operating system (OS) supports multi-tasks, more than 1 program may be running at one time, and the load on the CPU depends on the programs running. The CPU load is detected in the step S3 because the processing speed differs depending on the CPU load at the time when the speech recognition program runs.

A step S4 detects the memory capacity of a memory (not shown) used by the computer 100. This memory may be the internal memory of the computer 100 or an external memory. Usually, the memory is a RAM or the like coupled to a CPU of the computer 100. If the OS employs a virtual memory mechanism, it is possible to supplement the lack of memory space by a magnetic disk or the like by swapping. However, the access time to such a supplemented memory space is relatively long. Accordingly, the memory capacity is detected in the step S4 to determine the memory space that is accessible within the short tolerable access time.

A step S5 detects the state of the memory in use. If the OS supports multi-tasks, programs other than the speech recognition program may be using the memory, and the lack of memory space may occur even in the case of a memory having a large memory capacity. In addition, even if the OS does not support multi-tasks, the additional memory space supplemented by the magnetic disk or the like requires a relatively long access time. For this reason, the state of the memory in use is detected in the step S5 to determine the presently available memory space.

A step S6 detects the sampling frequency of the A/D converter provided within the speech input means 11a. The amount of information becomes larger as the sampling frequency becomes higher, but the number of samples per unit time also becomes large, thereby requiring a high processing capability. Hence, the sampling frequency is detected in the step S6 to determine the required processing capability. Normally, the sampling frequency is in the range of 8 kHz to 16 kHz.

A step S7 detects the quantization bit number of the A/D converter within the speech input means 11a. The dynamic range of the speech data becomes larger as the quantization bit number becomes larger. The quantization bit number is detected in the step S7 in order to determine the dynamic range of the speech data. Normally, the quantization bit number is 8, 12 or 16 bits.

Figure 6:
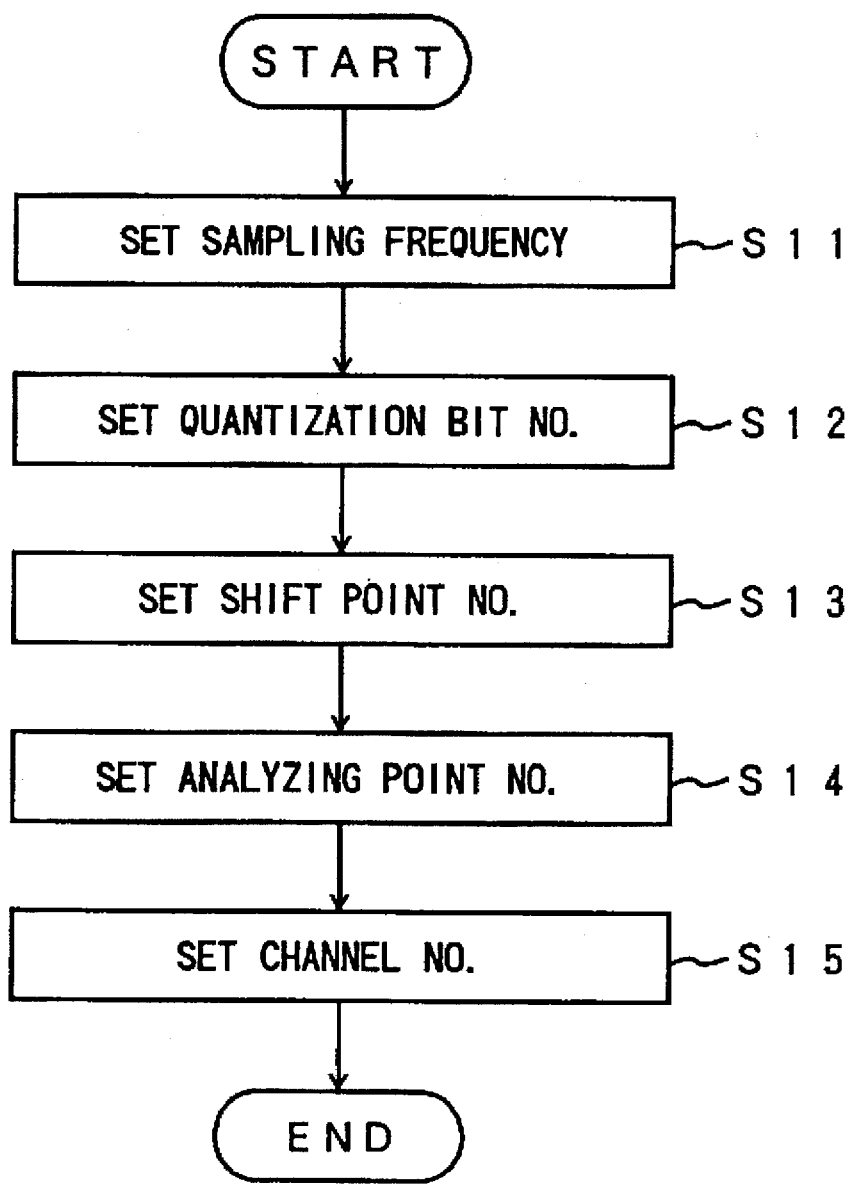
FIG. 6 is a flow chart showing an embodiment of the operation of a recognition parameter setting means of the first embodiment.

FIG. 6 shows an embodiment of the operation of the recognition parameter setting means 18a. In FIG. 6, a step S11 sets the down sampling quantity of the digital signal output from the speech input means 11a in the FFT analyzing means 12a as the recognition parameter. Even if the sampling frequency of the data obtained from the A/D converter within the speech input means 11a is high and the number of samples per unit time is large, it is possible to reduce the number of samples per unit time by carrying out the down sampling. In other words, if the digital signal output from the speech input means 11a is subjected to the down sampling, the band becomes narrow but the data quantity decreases, thereby reducing the amount of processing.

A step S12 sets the quantization bit number of the A/D converter within the speech input means 11a in the FFT analyzing means 12a as the recognition parameter.

Figure 7:
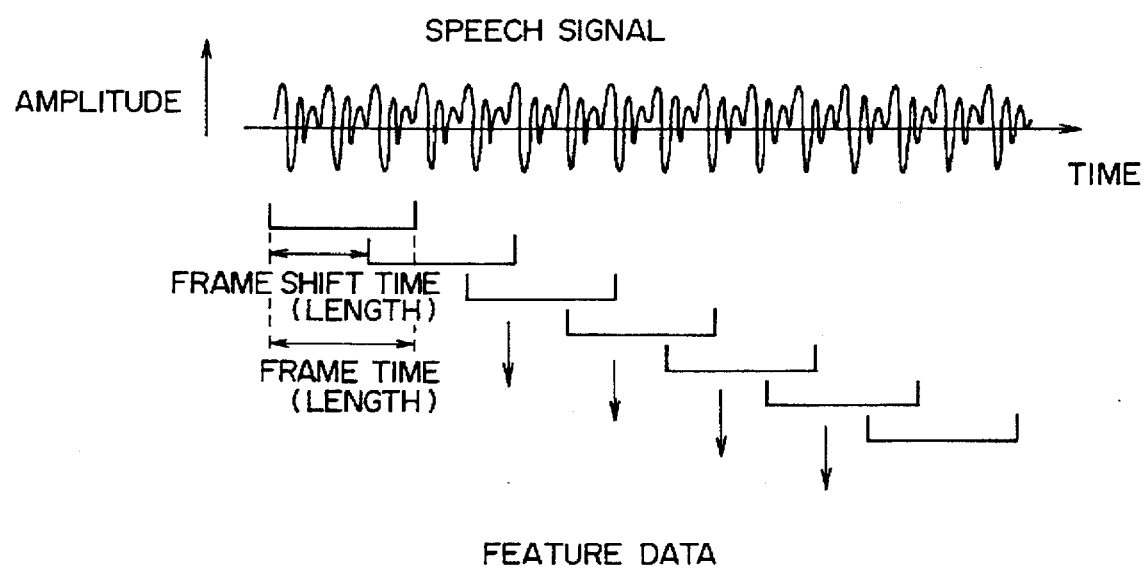
FIG. 7 is a diagram for explaining an analyzing process of the first embodiment.

A step S13 sets the number of shift points (hereinafter referred to as the shift point number) included in a frame shift portion between adjacent frames in the FFT analyzing means 12a as the recognition parameter. If the FFT analyzing process for 1 frame (time) is completed within 1 frame shift time as shown in FIG. 7, the FFT analysis can be made in real-time. Hence, when the shift point number is reduced for the same sampling frequency, the frame shift time becomes short and the real-time processing becomes impossible, thereby increasing the time delay of the process. In FIG. 7, the top portion indicates the amplitude versus time characteristic of the speech signal, and the bottom portion indicates the frame (time) and the frame shift time relative to the feature data.

A step S14 sets the number of analyzing points (hereinafter referred to as the analyzing point number) included in 1 frame which is the processing unit of the FFT analysis in the FFT analyzing means 12a as the recognition parameter. If the analyzing point number is increased, the accuracy becomes high but the data quantity increases, thereby increasing the amount of processing. As mentioned above, the FFT analysis can be made in real-time if the FFT analyzing process for 1 frame (time) is completed within 1 frame shift time as shown in FIG. 7.

A step S15 sets the feature pattern channel number integrated using the analysis values of the FFT analysis in the FFT analyzing means 12a as the recognition parameter. The feature pattern channel number refers to the number of channels used to represent the feature pattern per frame, and in general, there are 8 to 19 channels of the frequency component and the frame power. The data quantity increases and the amount of processing increases if the feature pattern channel number is large.

Of course, it is also possible to set other recognition parameters in the FFT analyzing means 12a. For example, the level down quantity of the digital signal output from the speech input means 11a may be set in the FFT analyzing means 12 as the recognition parameter.

FIG. 8 shows the relationship of the running environment detected by the running environment detecting means 17a and the recognition parameters set by the recognition parameter setting means 18a.

For example, when the CPU type detected by the running environment detecting means 17a indicates "high performance", the processing speed is high. For this reason, it is possible to treat a high sampling frequency, a small shift point number, a large analyzing point number, and a large feature pattern channel number.

On the other hand, when the clock frequency detected by the running environment detecting means 17a indicates "low frequency", the processing speed is low. In this case, it is only possible to treat a low sampling frequency, a large shift point number, a small analyzing point number, and a small feature pattern channel number.

In addition, when the CPU load detected by the running environment detecting means 17a indicates "low load", the processing speed is high. For this reason, it is possible to treat a high sampling frequency, a small shift point number, a large analyzing point number, and a large feature pattern channel number.

Furthermore, when the memory capacity detected by the running environment detecting means 17a indicates "small capacity", the swapping process must be carried out frequently between the memory and a disk unit or the like. In this case, it is only possible to treat a low sampling frequency, a large shift point number, a small analyzing point number, and a small feature pattern channel number.

On the other hand, when the state of the memory in use detected by the running environment detecting means 17a indicates "large amount in use", the swapping process must be carried out frequently between the memory and a disk unit or the like. Hence, it is only possible to treat a low sampling frequency, a large shift point number, a small analyzing point number, and a small feature pattern channel number.

When the sampling frequency of the A/D converter detected by the running environment detecting means 17a indicates "high frequency", it is possible to carry out the down sampling process.

In addition, when the quantization bit number of the A/D converter detected by the running environment detecting means 17a indicates "large", it is possible to carry out the level down process with respect to the quantization bit number.

The recognition parameter setting means 18a determines the recognition parameters conforming to the detected running environment based on the relationship shown in FIG. 8, and sets the determined recognition parameters in the FFT analyzing means 12a.

Next, a description will be given of an embodiment of the process which determines the recognition parameters in the FFT analyzing means 12a.

The process of determining the recognition parameters may be carried out by the recognition parameter setting means 18a by use of the conversion table 25 shown in FIG. 4 which manages the appropriate corresponding relationships of the running environment values and the recognition parameter values. When the running environment detecting means 17a detects the running environment, the recognition parameter values corresponding to the running environment values are read from the conversion table 25, and predetermined operations are carried out on the read recognition parameter values.

FIGS. 9 and 10 show an embodiment of the conversion table 25 which manages the corresponding relationships of the running environment values and the recognition parameter values. In FIGS. 9 and 10, a column I indicates the recognition parameter values related to the sampling frequency, a column II indicates the recognition parameter values related to the quantization bit number, a column III indicates the recognition parameter values related to the shift point number represented as a percentage with respect to the analyzing point number, a column IV indicates the recognition parameter values related to the analyzing point number, and a column V indicates the recognition parameter values related to the feature pattern channel number.

First, the recognition parameter setting means 18a detects for example the running environment values such as B for the CPU type, 25 MHz for the clock frequency, 40% for the CPU load, 6 MB for the memory capacity, 60% for the state of the memory in use, 16 kHz for the sampling frequency of the A/D converter, and 16 bits for the quantization bit number of the A/D converter. The recognition parameter setting means 18a reads from the conversion table 25 shown in FIGS. 9 and 10 the recognition parameters corresponding to the detected running environment values. FIG. 11 shows the recognition parameter values read from the conversion table 25 in this case.

Then, in order to be on the safe side when selecting the recognition parameter values read from the conversion table 25, the recognition parameter setting means 18a selects the smaller one of each of the recognition parameter values shown in FIG. 11 read from the conversion table 25. For example, 8 kHz for the sampling frequency, 16 bits for the quantization bit number, 166 for the shift point number, 256 for the analyzing point number, and 12 for the feature pattern channel number are determined by the recognition parameter setting means 18a as the recognition parameters and are set in the FFT analyzing means 12a.

Alternatively, the recognition parameter setting means 18a may select the recognition parameter values shown in FIG. 11 read from the conversion table 25 by majority, that is, by carrying out a predetermined operation on combinations of the recognition parameter values read from the conversoin table 25 by being specified by the detected running environment values. In this latter case which decides by majority, 12 kHz for the sampling frequency, 16 bits for the quantization bit number, 205 for the shift point number, 258 for the analyzing point number, and 12 for the feature pattern channel number are determined by the recognition parameter setting means 18a as the recognition parameters and are set in the FFT analyzing means 12a.

The quantization bit number essentially does not affect the processing time. For this reason, the quantization bit number of the A/D converter is used as it is in the above two cases.

FIG. 11 described above shows the recognition parameter values read from the conversion table 25 when the running environment is an average or standard environment. On the other hand, FIG. 12 shows the recognition parameter values read from the conversion table 25 shown in FIGS. 9 and 10 when the running environment is a good environment. Furthermore, FIG. 13 shows the recognition parameter values read from the conversion table 25 shown in FIGS. 9 and 10 when the running environment is a poor environment.

In order to be on the safe side when selecting the recognition parameter values read from the conversion table 25, the recognition parameter setting means 18a selects the smaller one of each of the recognition parameter values shown in FIG. 12 read from the conversion table 25. For example, 12 kHz for the sampling frequency, 16 bits for the quantization bit number, 205 for the shift point number, 256 for the analyzing point number, and 12 for the feature pattern channel number are determined by the recognition parameter setting means 18a as the recognition parameters and are set in the FFT analyzing means 12a.

Alternatively, the recognition parameter setting means 18a may select the recognition parameter values shown in FIG. 12 read from the conversion table 25 by majority. In this latter case which decides by majority, 16 kHz for the sampling frequency, 16 bits for the quantization bit number, 333 for the shift point number, 512 for the analyzing point number, and 16 for the feature pattern channel number are determined by the recognition parameter setting means 18a as the recognition parameters and are set in the FFT analyzing means 12a.

Accordingly, when the running environment is good, the recognition parameters for realizing a highly accurate recognition process are set.

On the other hand, in order to be on the safe side when selecting the recognition parameter values read from the conversion table 25, the recognition parameter setting means 18a selects the smaller one of each of the recognition parameter values shown in FIG. 13 read from the conversion table 25. For example, 8 kHz for the sampling frequency, 12 bits for the quantization bit number, 128 for the shift point number, 128 for the analyzing point number, and 8 for the feature pattern channel number are determined by the recognition parameter setting means 18a as the recognition parameters and are set in the FFT analyzing means 12a.

Alternatively, the recognition parameter setting means 18a may select the recognition parameter values shown in FIG. 13 read from the conversion table 25 by majority. In this latter case which decides by majority, 8 kHz for the sampling frequency, 12 bits for the quantization bit number, 128 for the shift point number, 128 for the analyzing point number, and 8 for the feature pattern channel number are determined by the recognition parameter setting means 18a as the recognition parameters and are set in the FFT analyzing means 12a.

Accordingly, when the running environment is poor, the recognition parameters for realizing a satisfactory response characteristic are set by sacrificing the accuracy of the recognition process to a certain extent.

Therefore, in this first embodiment shown in FIG. 4, the recognition parameters are set in the FFT analyzing means 12a by the above described process of the recognition parameter setting means 18a. Then, the speech matching means 15a carries out a matching process to match the feature data extracted by the FFT analyzing means 12a and the feature data (dictionary data) registered in the dictionary 10a, and carries out a recognition process by specifying the registered feature data that most closely resembles that of the input speech signal. The recognition result output means 16a outputs the recognition result based on the result of the recognition process carried out by the speech matching means 15a.

Hence, this first embodiment carries out the speech recognition of the input speech signal by flexibly modifying the recognition parameters used in the speech recognition depending on the running environment provided by the hardware of the computer 100 which carries out the speech recognition. As a result, it is possible to realize an optimum speech recognition process for the computer 100 by use of the same recognition software which may be used in common among different types of computers.

In FIG. 4, the FFT analyzing means 12a is used. However, the analyzing technique is not limited to the FFT analyzing technique, and various other analyzing techniques may be employed depending on the needs. In other words, an analyzing means which employs an analyzing technique other than the FFT analyzing technique may be used in place of the FFT analyzing means 12a.

Examples of known analyzing techniques include the filter bank analysis, the FFT analysis described above, the LPC analysis, and the cepstrum analysis. The filter bank analysis uses a plurality of filter banks to extract spectrums in different frequency bands and obtains a time-sequence of the spectrums. The FFT analysis carries out the FFT and obtains a time-sequence of the spectral power in divided channels. The LPC analysis carries out the LPC and obtains a time-sequence of the coefficients. The cepstrum analysis carries out the FFT cepstrum analysis based on the FFT analysis or the LPC cepstrum analysis based on the LPC analysis.

Furthermore, the conversion table 25 is not limited to that described above, and various kinds of conversion tables may be used. For example, instead of storing the actual recognition parameter values for each of the running environment values, it is possible to simply store standard recognition parameter values for each of the running environment values, and to carry out a predetermined operation on each standard recognition parameter value depending on the particular running environment value.

The standard recognition parameter values for the sampling frequency, the quantization bit number, the shift point number, the analyzing point number and the feature pattern channel number respectively are set to the sampling frequency of the A/D converter within the speech input means 11a, the quantization bit number of the A/D converter, 80% of the analyzing point number, 256 and 12, for example. In this case, for a particular CPU type (running environment), the standard recognition parameter values are used if the CPU type is a standard type. But if the CPU type has a poorer performance than the standard type, a down sampling is made and the sampling frequency is selected to 8, 12 or 16 kHz, the quantization bit number is selected to 8, 12 or 16 bits, the shift point number is selected to (standard shift point number)×(1+¼), the analyzing point number is selected to (standard analyzing point number)×(1−½), and the feature pattern channel number is selected to (standard channel number)×(1−⅓), for example. The recognition parameter values may be selected similarly by carrying out predetermined operations on the standard recognition parameter values for other running environments such as the clock frequency, the CPU load, the memory capacity, the state of memory in use, the sampling frequency of the A/D converter and the quantization bit number of the A/D converter.

Next, a description will be given of a second embodiment of the speech recognition apparatus according to the present invention, by referring to FIGS. 14 and 15. This second embodiment uses the operating principle of the first aspect of the present invention described above in conjunction with FIG. 2.

Figure 14:
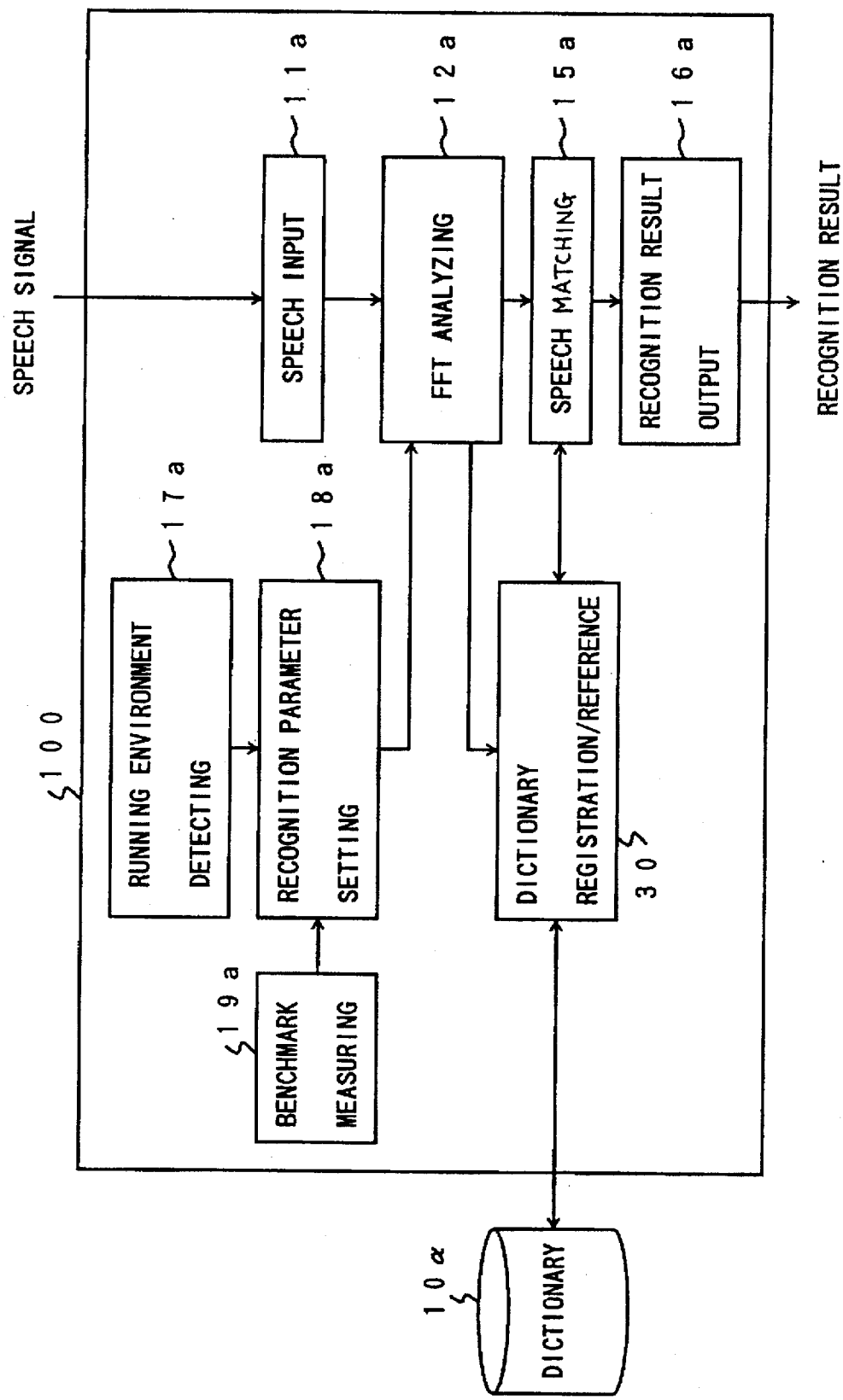
FIG. 14 is a system block diagram showing a second embodiment of the speech recognition apparatus according to the present invention.

FIG. 14 shows the second embodiment, and in FIG. 14, those parts which are the same as those corresponding parts in FIG. 2 are designated by the same reference numerals, and a description thereof will be omitted.

In FIG. 14, a benchmark measuring means 19a is provided in addition to the elements shown in FIG. 4. This benchmark measuring means 19a is provided for the purposes of improving the accuracy of the running environment detection.

The benchmark measuring means 19a corresponds to the first measuring means 19 shown in FIG. 2. The benchmark measuring means 19a measures the benchmark by running a benchmark program, so as to detect the running environment of the CPU. When this benchmark measuring means 19a is provided, the recognition parameter setting means 18a determines the optimum recognition parameters by taking into consideration the measured result of the benchmark measuring means 19a.

Figure 15:
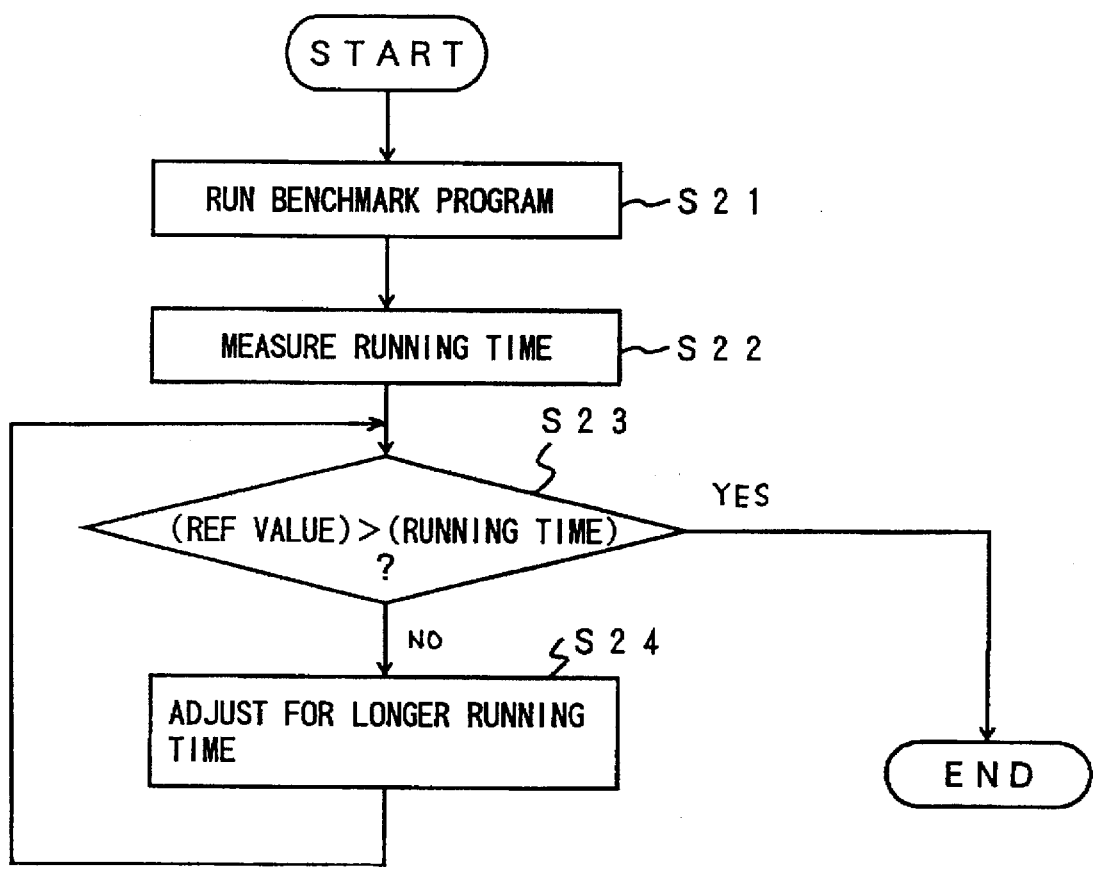
FIG. 15 is a flow chart for explaining the operations of a bench mark measuring means and a recognition parameter setting means of the second embodiment.

FIG. 15 shows a flow chart for explaining the operations of the benchmark measuring means 19a and the recognition parameter setting means 18a of the second embodiment. In FIG. 15, steps S21 through S23 are carried out by the benchmark measuring means 19a. On the other hand, a step S24 is carried out by the recognition parameter setting means 18a.

In FIG. 15, the step S21 runs the benchmark program, and the step S22 measures the running time or processing time of the benchmark program. Then, the step S23 decides whether or not the measured running time or processing time is less than a reference value. If the decision result in the step S23 is NO, the step S24 sets the recognition parameters by changing the recognition parameters to larger or smaller values so that the running time or processing time becomes greater than or equal to the reference value, and the process returns to the step S23. On the other hand, if the decision result in the step S23 is YES, the process ends.

Next, a description will be given of a third embodiment of the speech recognition apparatus according to the present invention, by referring to FIGS. 16 and 17. This third embodiment uses the operating principle of the first aspect of the present invention described above in conjunction with FIG. 2.

Figure 16:
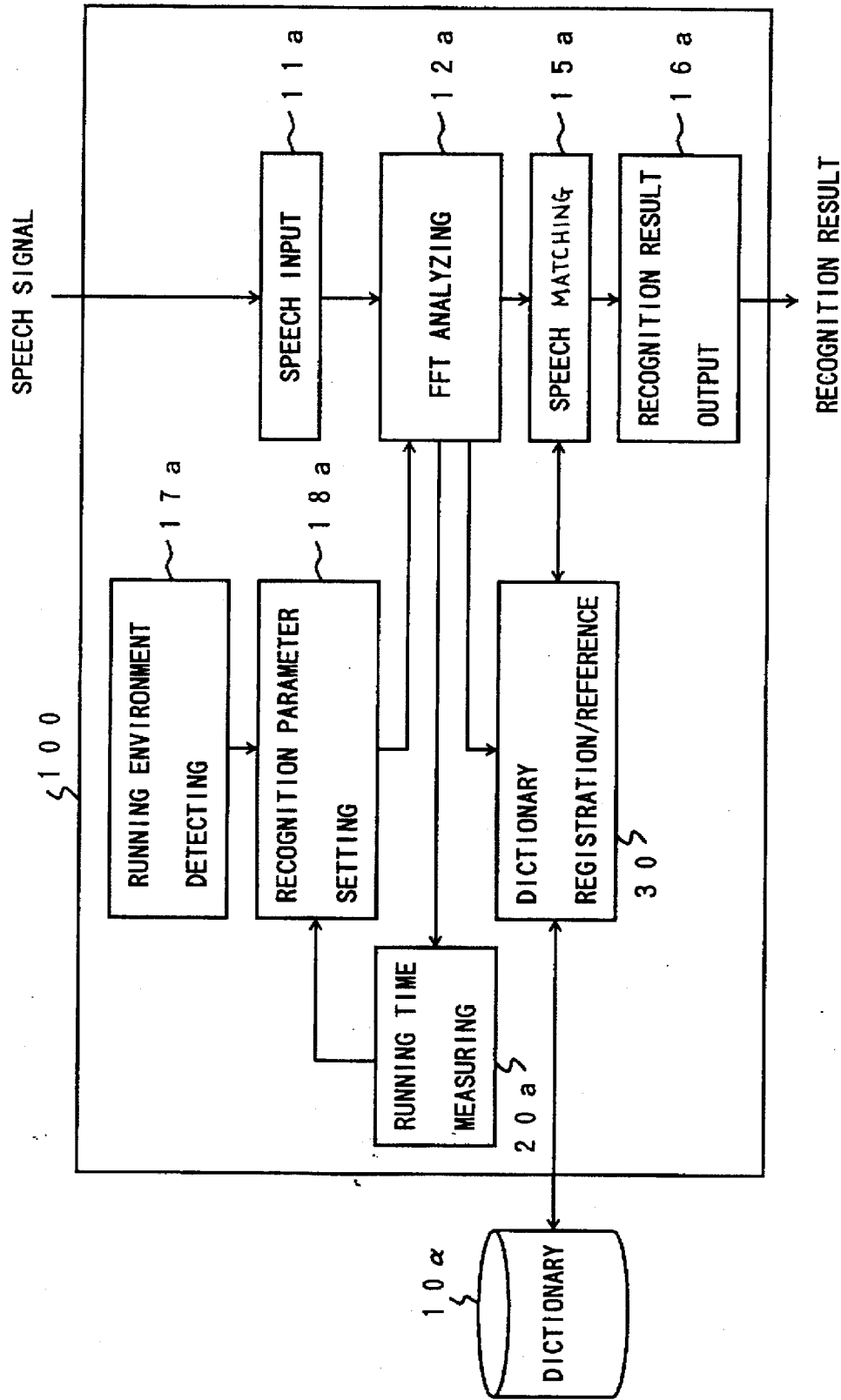
FIG. 16 is a system block diagram showing a third embodiment of the speech recognition apparatus according to the present invention.

FIG. 16 shows the third embodiment, and in FIG. 16, those parts which are the same as those corresponding parts in FIG. 2 are designated by the same reference numerals, and a description thereof will be omitted.

In FIG. 16, a running time measuring means 20a is provided in place of the benchmark measuring means 19a shown in FIG. 14.

The running time measuring means 20a corresponds to the second measuring means 20 shown in FIG. 2. This running time measuring means 20a measures the time required to analyze 1 frame, so as to detect the running environment of the CPU with a high accuracy. When this running time measuring means 20a is provided, the recognition parameter setting means 18a determines the optimum recognition parameters by taking into consideration the measured result of the running time measuring means 20a. More particularly, the recognition parameter setting means 18a determines the recognition parameters so that the running time or processing time measured by the running time measuring means 20a falls within 1 frame shift time, in order to ensure real-time processing of the speech recognition.

Figure 17:
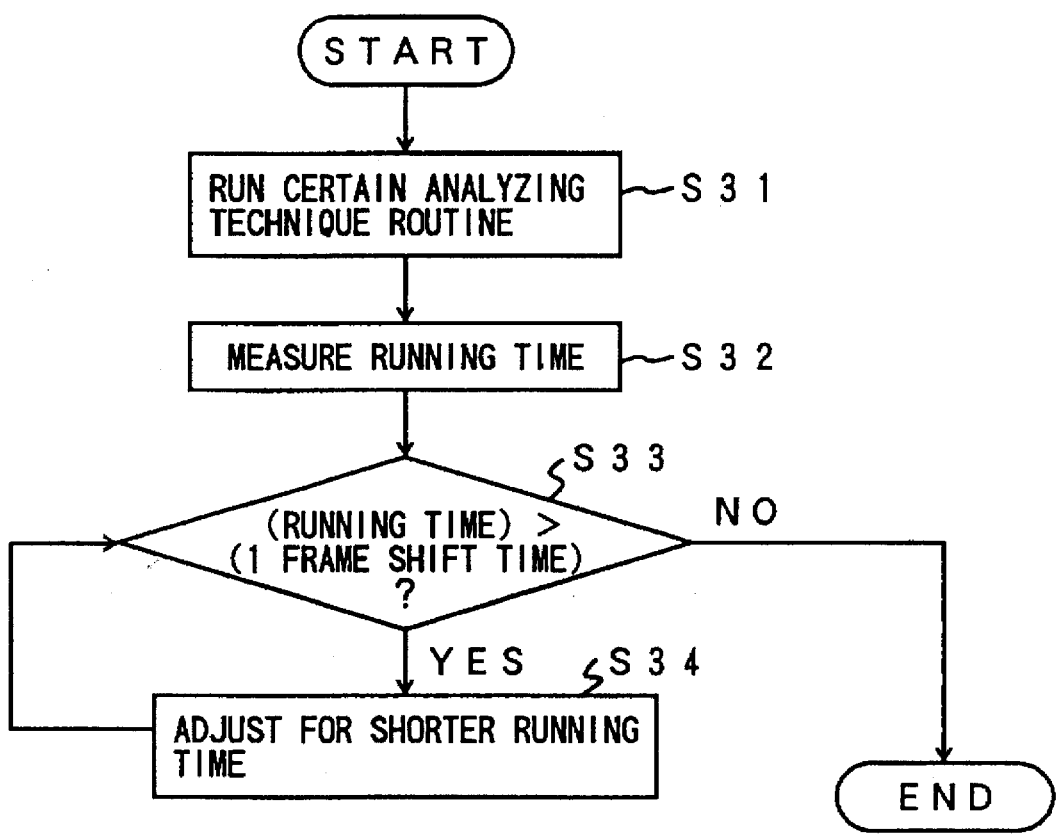
FIG. 17 is a flow chart for explaining the operations of a running time measuring means and a recognition parameter setting means of the third embodiment.

FIG. 17 shows a flow chart for explaining the operations of the running time measuring means 20a and the recognition parameter setting means 18a of the third embodiment. In FIG. 17, steps S31 through S33 are carried out by the running time measuring means 20a. On the other hand, a step S34 is carried out by the recognition parameter setting means 18a.

In FIG. 17, the step S31 runs an analyzing routine employing a certain analyzing technique, and the step S32 measures the running time or processing time of the analyzing routine. Then, the step S33 decides whether or not the measured running time or processing time is greater than 1 frame shift time. If the decision result in the step S33 is YES, the step S34 sets the recognition parameters by changing the recognition parameters to larger or smaller values so that the running time or processing time becomes less than or equal to 1 frame shift time. On the other hand, if the decision result in the step S33 is NO, the process returns to the original program.

Next, a description will be given of a fourth embodiment of the speech recognition apparatus according to the present invention, by referring to FIGS. 18 and 19. This fourth embodiment uses the operating principle of the first aspect of the present invention described above in conjunction with FIG. 2.

Figure 18:
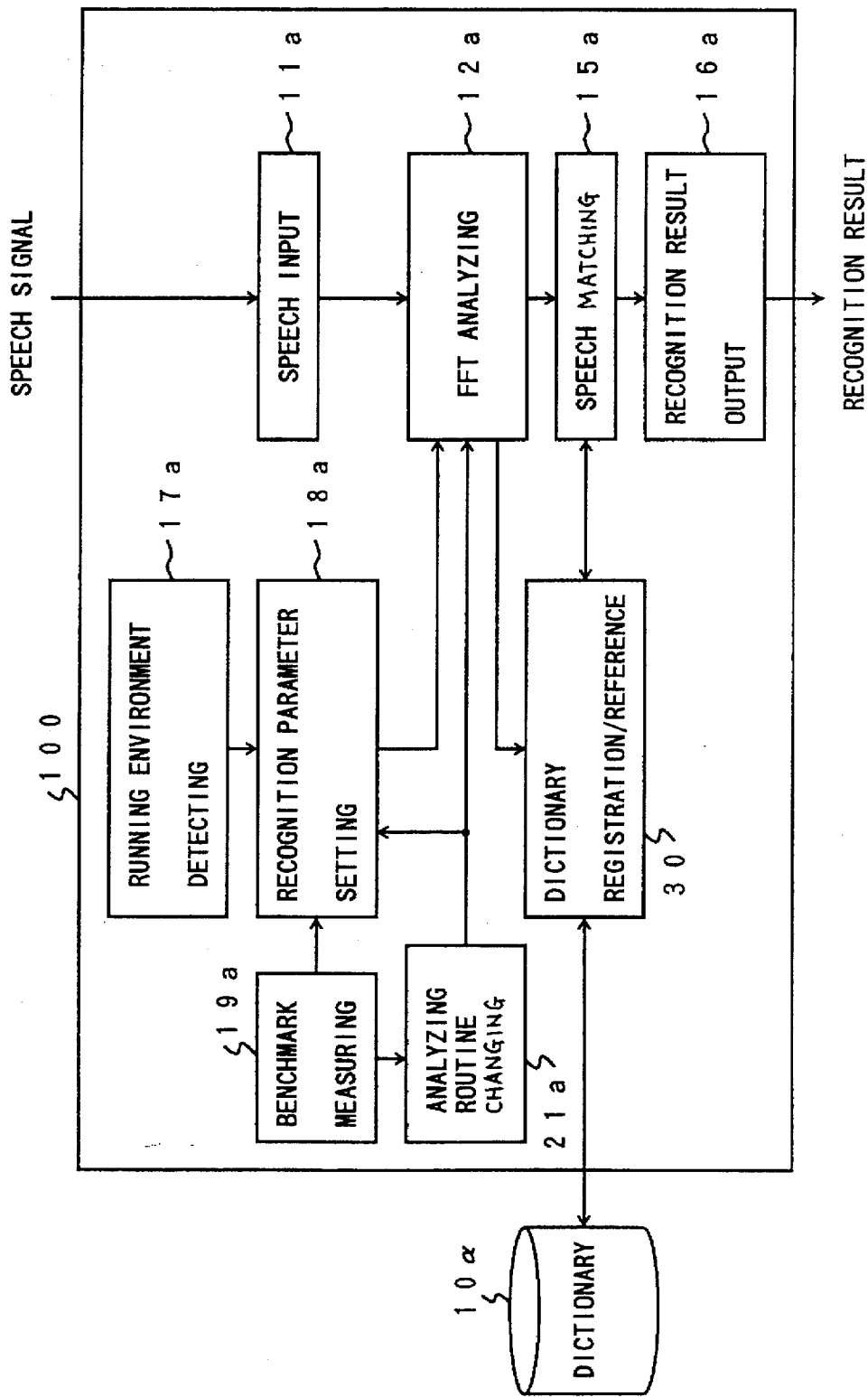
FIG. 18 is a system block diagram showing a fourth embodiment of the speech recognition apparatus according to the present invention.

FIG. 18 shows the fourth embodiment, and in FIG. 18, those parts which are the same as those corresponding parts in FIGS. 2 and 14 are designated by the same reference numerals, and a description thereof will be omitted.

In FIG. 18, a speech analyzing means 12b is provided in place of the FFT analyzing means 12a shown in FIG. 14, and an analyzing routine changing means 21a is additionally provided.

The speech analyzing means 12b analyzes the digital signal output from the speech input means 11a depending on the set recognition parameters using a specified analyzing technique, and extracts the feature data of the input speech signal. For example, when the FFT analyzing technique is specified as the analyzing technique to be used, the feature data of the speech signal are extracted according to the FFT analyzing technique. The feature data of the speech signal are extracted according to the LPC analyzing technique when the LPC analyzing technique is specified as the analyzing technique to be used. The feature data of the speech signal are extracted according to the filter bank analyzing technique when the filter bank analyzing technique is specified as the analyzing technique to be used. Further, the feature data of the speech signal are extracted according to the cepstrum analyzing technique when the cepstrum analyzing technique is specified as the analyzing technique to be used.

On the other hand, the analyzing routine changing means 21a corresponds to the changing means 21 shown in FIG. 2. The analyzing routine changing means 21a changes the analyzing technique used by the speech analyzing means 12b to an analyzing technique that requires only a short processing time by giving priority to the processing time rather than to the accuracy of the recognition process when the CPU performance is poor, based on the detection result of the benchmark detecting means 19a. On the other hand, the analyzing routine changing means 21a changes the analyzing technique used by the speech analyzing means 12b to an analyzing technique that realizes a recognition process with a high accuracy by giving priority to the accuracy of the recognition process rather than to the processing time when the CPU performance is good, based on the detection result of the benchmark detecting means 19a.

In other words, due to the provision of the analyzing routine changing means 21a, the feature data of the speech signal are extracted using an analyzing technique that is suited for the running environment.

In FIG. 18, the analyzing routine changing means 21a is provided in addition to the elements of the second embodiment shown in FIG. 14. However, it is of course possible to provide the analyzing routine changing means 21a in addition to the elements of the third embodiment shown in FIG. 16.

Figure 19:
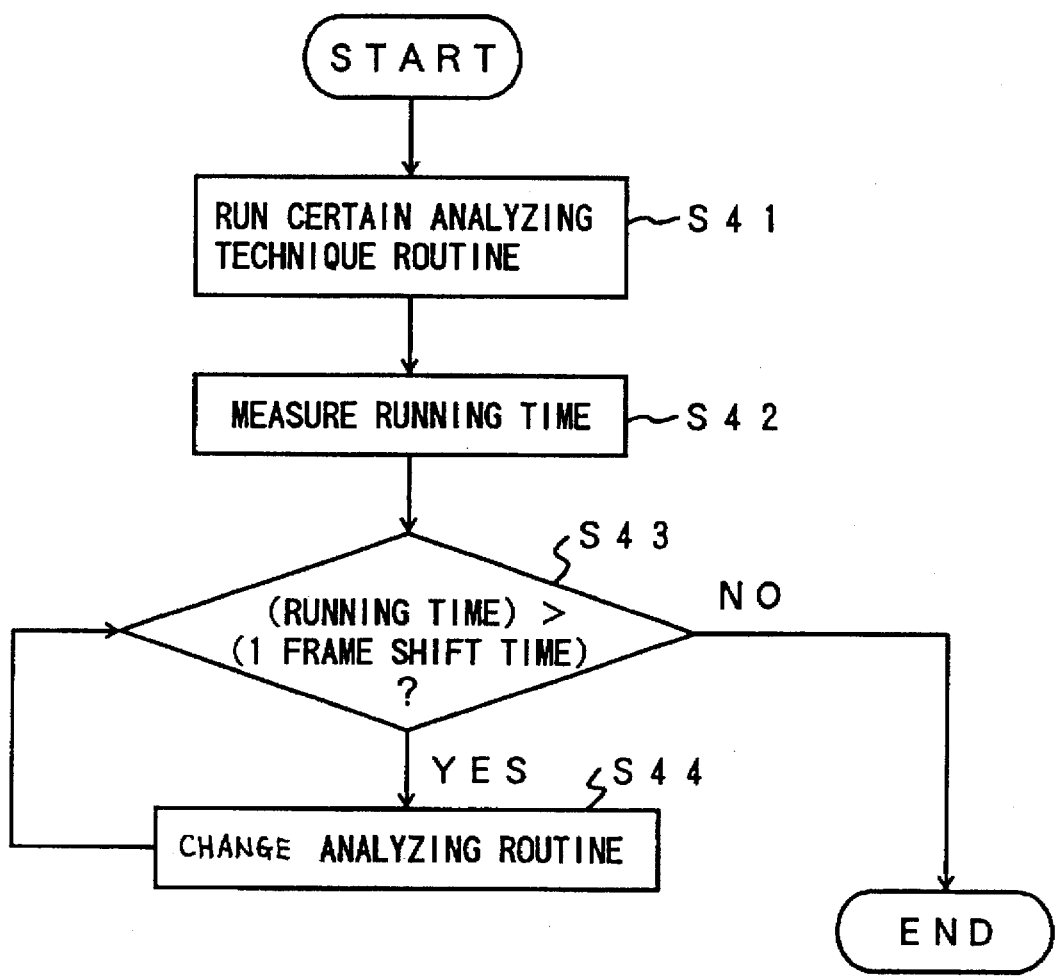
FIG. 19 is a flow chart for explaining the operations of a benchmark measuring means and an analyzing routine changing means of the fourth embodiment.

FIG. 19 shows a flow chart for explaining the operations of the benchmark measuring means 19a and the analyzing routine changing means 21a of the fourth embodiment. In FIG. 19, steps S41 through S43 are carried out by the benchmark measuring means 19a, and a step S44 is carried out by the analyzing routine changing means 21a.

In FIG. 19, the step S41 runs an analyzing routine employing a certain analyzing technique, and the step S42 measures the running time or processing time of the analyzing routine. Then, the step S43 decides whether or not the measured running time or processing time is greater than 1 frame shift time. If the decision result in the step S43 is YES, the step S44 changes the analyzing routine to be used by the speech analyzing means 12b. On the other hand, if the decision result in the step S43 is NO, the process returns to the original program.

Next, a description will be given of a fifth embodiment of the speech recognition apparatus according to the present invention, by referring to FIGS. 20 and 21. This fifth embodiment uses the operating principle of the second aspect of the present invention described above in conjunction with FIG. 3.

Figure 20:
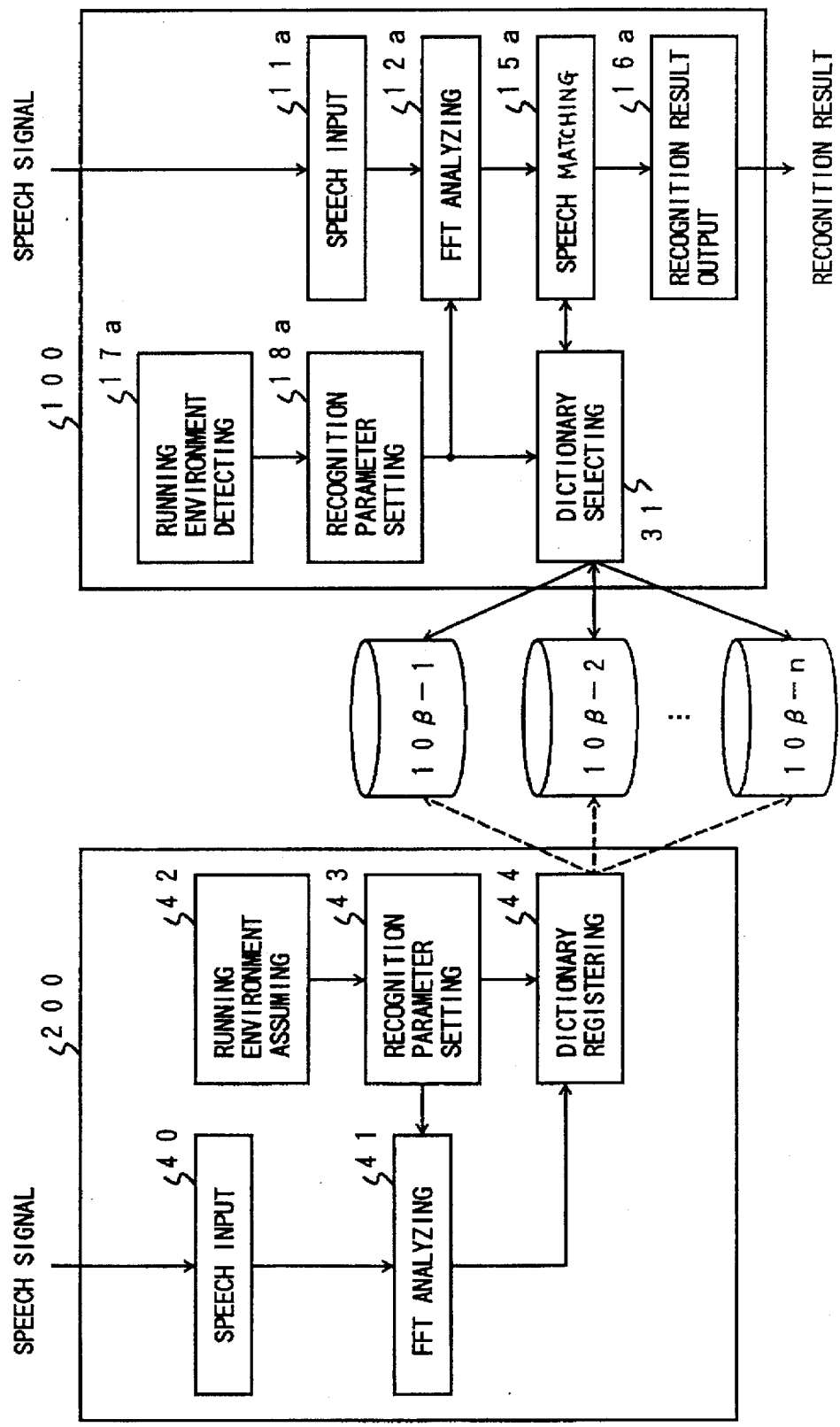
FIG. 20 is a system block diagram showing a fifth embodiment of the speech recognition apparatus according to the present invention.

FIG. 20 shows the fifth embodiment, and in FIG. 20, those parts which are the same as those corresponding parts in FIGS. 2 and 14 are designated by the same reference numerals, and a description thereof will be omitted.

In FIG. 20, a dictionary selecting means 31 is provided in the computer 100. Further, a computer 200 is provided in addition to the computer 100. The computer 200 is used to make the feature data (dictionary data) of the dictionaries 10β-i. The computer 200 includes a speech input means 40, a FFT analyzing means 41, a running environment assuming means 42, a recognition parameter setting means 43, and a dictionary registering means 44.

The functions of the speech input means 40, the FFT analyzing means 41, and the recognition parameter setting means 43 of the computer 200 respectively are basically the same as those of the speech input means 11a, the FFT analyzing means 12a, and the recognition parameter setting means 18a of the computer 100.

The running environment assuming means 42 of the computer 200 assumes the various running environments provided by the hardware of the computer 100 when the speech recognition is actually carried out. The recognition parameter setting means 43 determines the optimum recognition parameters under each running environment assumed by the running environment assuming means 42. The recognition parameters are set in the FFT analyzing means 41, and the FFT analyzing means 41 extracts the feature data of the speech signal obtained via the speech input means 40 based on the set recognition parameters. The dictionary registering means 44 registers the extracted feature data in the dictionaries 10β-i, where i=1, ..., n, and the dictionaries 10β-i having the registered feature data are prepared.

When the recognition parameter setting means 18a of the computer 100 determines the recognition parameters, the dictionary selecting means 31 of the computer 100 selects the dictionary 10β-i corresponding to the determined recognition parameters, and the dictionary selecting means 31 supplies the feature data (dictionary data) from this corresponding dictionary 10β-i to the speech matching means 15a. The speech matching means 15a carries out the recognition process based on the feature data of the input speech signal and the feature data read from the corresponding dictionary 10β-i selected by the dictionary selecting means 31. Hence, the dictionary selecting means 31 corresponds to the selecting means 22 shown in FIG. 3.

Therefore, in this fifth embodiment, the dictionaries 10β-i are made by the computer 200 which is independent of the computer 100 which carries out the speech recognition by the recognition software. In addition, the dictionaries 10β-i are made by the running environments, that is, for each running environment, for example.

Figure 21:
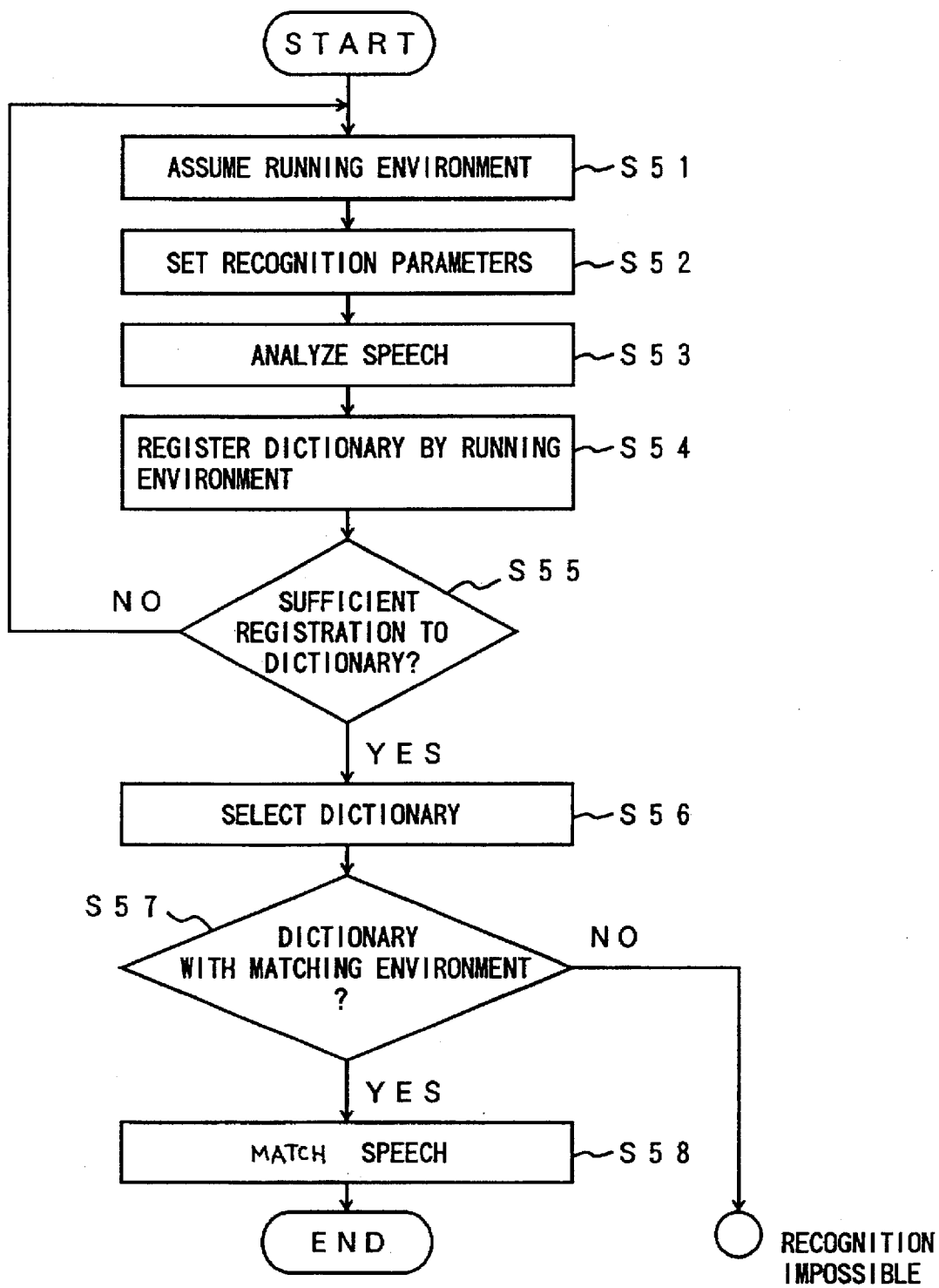
FIG. 21 is a flow chart for explaining the operations of a running environment assuming means, a dictionary registering means and a dictionary selecting means of the fifth embodiment.

FIG. 21 shows a flow chart for explaining the operations of the running environment assuming means 42, the dictionary registering means 44 and the dictionary selecting means 31 of the fifth embodiment shown in FIG. 20.

In FIG. 21, the running environment assuming means 42 assumes the running environment provided by the hardware of the computer 100 in a step S51. The recognition parameter setting means 43 determines the recognition parameters based on the assumed running environment in a step S52. The FFT analyzing means 41 analyzes the speech signal in a step S53 using the recognition parameters set by the recognition parameter setting means 43. In a step S54, the dictionary registering means 44 registers the feature data extracted by the FFT analyzing means 41. The dictionary registering means 44 also decides whether or not a sufficient amount of feature data have been registered in the dictionaries 10β-i in a step S55. The process returns to the step S51 if the decision result in the step S55 is NO.

On the other hand, if the decision result in the step S55 is YES, the dictionary selecting means 31 of the computer 100 in a step S56 selects the dictionary 10β-i corresponding to the recognition parameters determined by the recognition parameter setting means 18a of the computer 100. In addition, the dictionary selecting means 31 decides in a step S57 whether or not a dictionary 10β-i with a running environment matching that detected by the running environment detecting means 17a exists among the dictionaries 10β-i. If the decision result in the step S57 is NO, it is regarded that the speech recognition is not possible. On the other hand, if the decision result in the step S57 is YES, the speech matching means 15a of the computer 100 carries out the recognition process described above in a step S58.

Next, a description will be given of a sixth embodiment of the speech recognition apparatus according to the present invention, by referring to FIGS. 22 and 23. This sixth embodiment uses the operating principle of the second aspect of the present invention described above in conjunction with FIG. 3.

Figure 22:
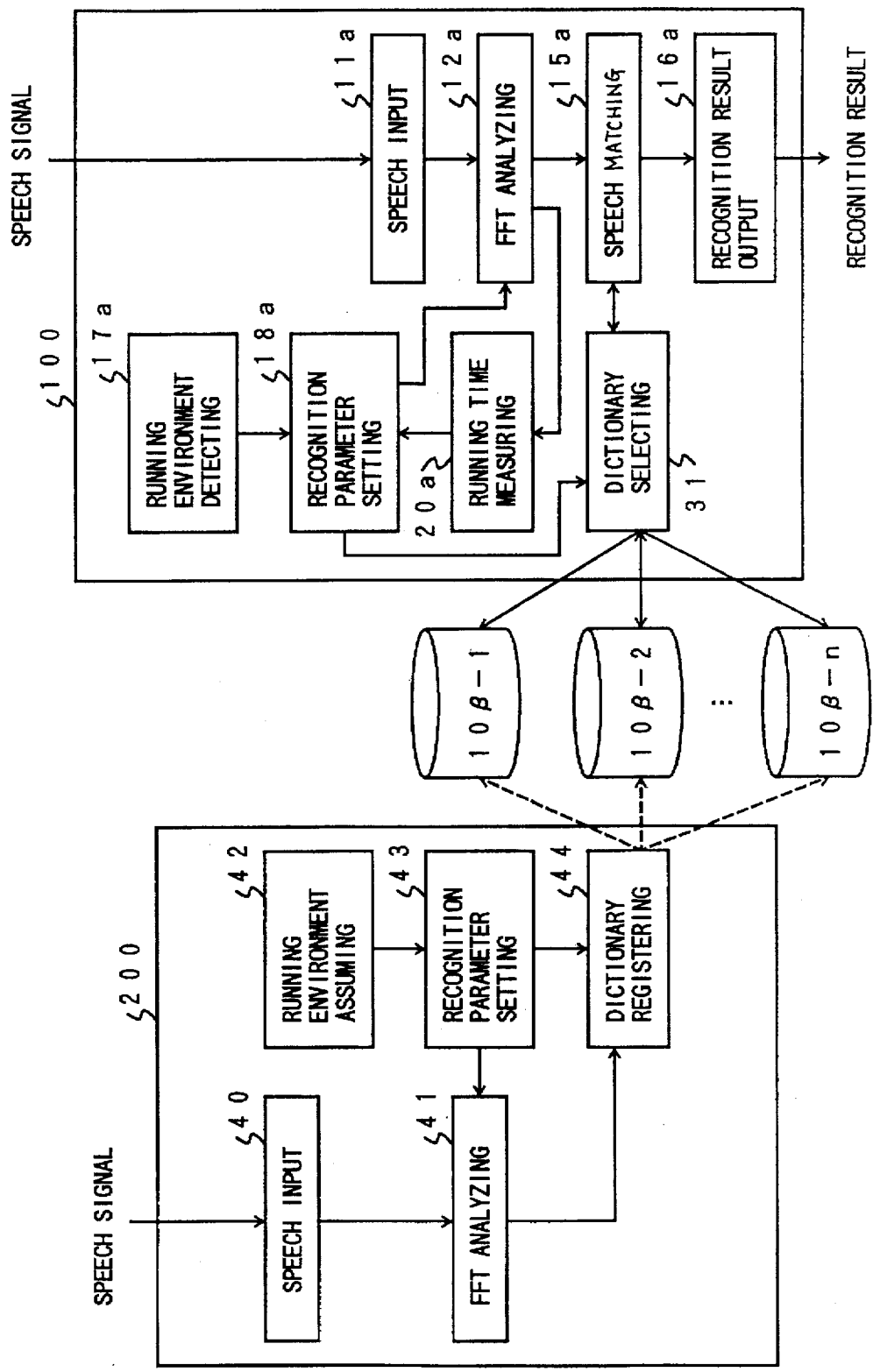
FIG. 22 is a system block diagram showing a sixth embodiment of the speech recognition apparatus according to the present invention.

FIG. 22 shows the sixth embodiment, and in FIG. 22, those parts which are the same as those corresponding parts in FIGS. 2, 16 and 20 are designated by the same reference numerals, and a description thereof will be omitted.

Basically, this sixth embodiment realizes the construction of the fifth embodiment shown in FIG. 20 using the third embodiment shown in FIG. 16.

Of course, it is possible to use a benchmark measuring means 19a in place of the running time measuring means 20a shown in FIG. 22.

Figure 23:
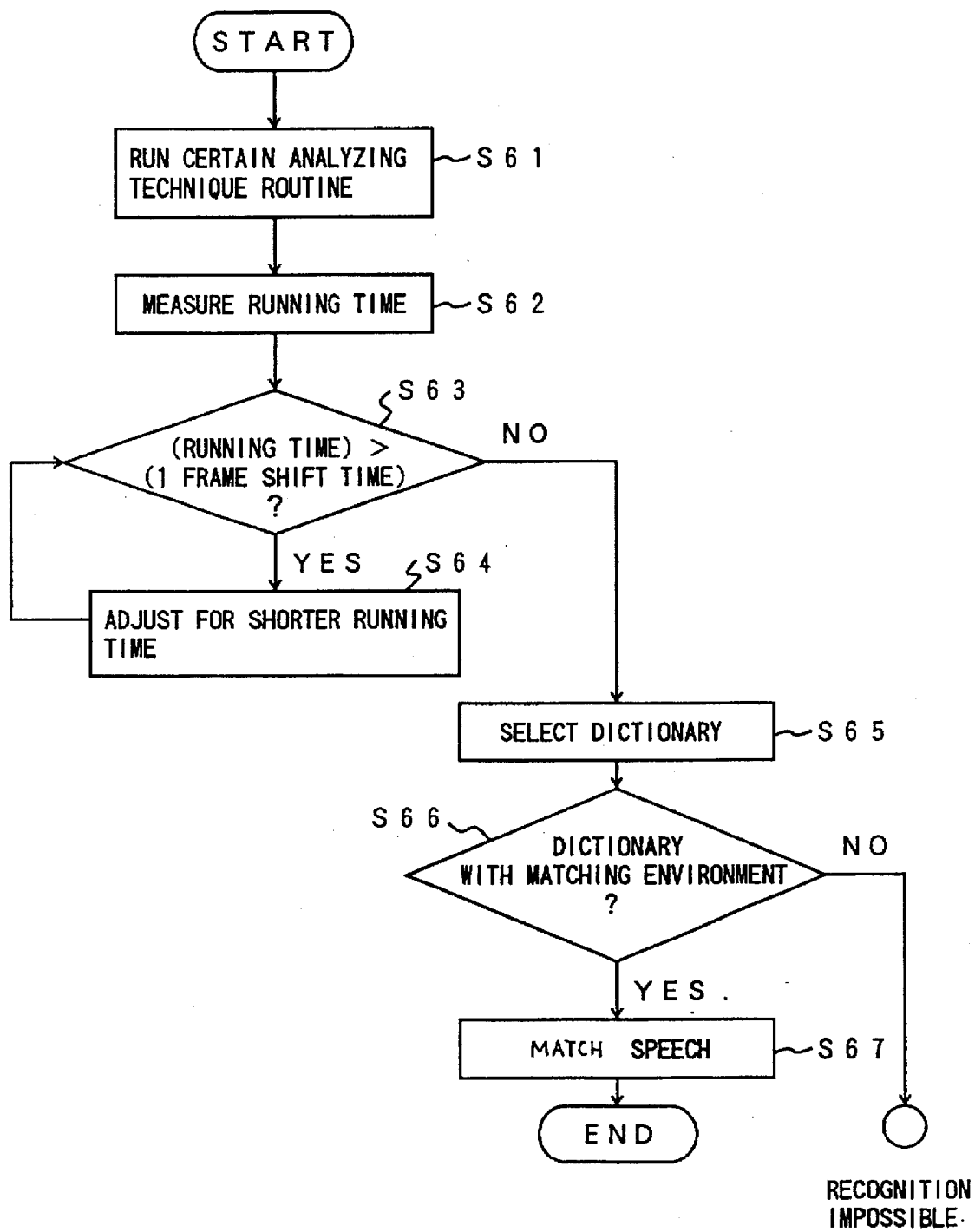
FIG. 23 is a flow chart for explaining the operations of a FFT analyzing means, a running time measuring means, a recognition parameter setting means and a dictionary selecting means of the sixth embodiment.

FIG. 23 shows a flow chart for explaining the operations of the FFT analyzing means 12a, the running time measuring means 20a, the recognition parameter setting means 18a, and the dictionary selecting means 31 of the computer 100. It is assumed for the sake of convenience that the dictionaries 10β-i are already made by the process described above with reference to FIG. 21.

In FIG. 23, the FFT analyzing means 12a analyzes the feature data of the input speech signal by an analyzing routine using a certain analyzing technique in a step S61. The running time measuring means 20a measures the running time or processing time of the analyzing routine in a step S62. The running time measuring means 20a also decides whether or not the running time or processing time is greater than 1 frame shift time in a step S63. If the decision result in the step S63 is YES, the recognition parameter setting means 18a sets the recognition parameters by changing the recognition parameters to larger or smaller values so that the running time or processing time becomes less than or equal to 1 frame shift time, and the process returns to the step S63. On the other hand, if the decision result in the step S63 is NO, the dictionary selecting means 31 selects in a step S65 the dictionary 10β-i that is made for the appropriate running environment. The dictionary selecting means 31 also decides in a step S66 whether or not a dictionary 10β-i with a running environment matching that detected by the running environment detecting means 17a exists among the dictionaries 10β-i. If the decision result in the step S66 is NO, it is regarded that the speech recognition is not possible. On the other hand, if the decision result in the step S66 is YES, the speech matching means 15a carries out the recognition process described above in a step S67.

Figure 24:
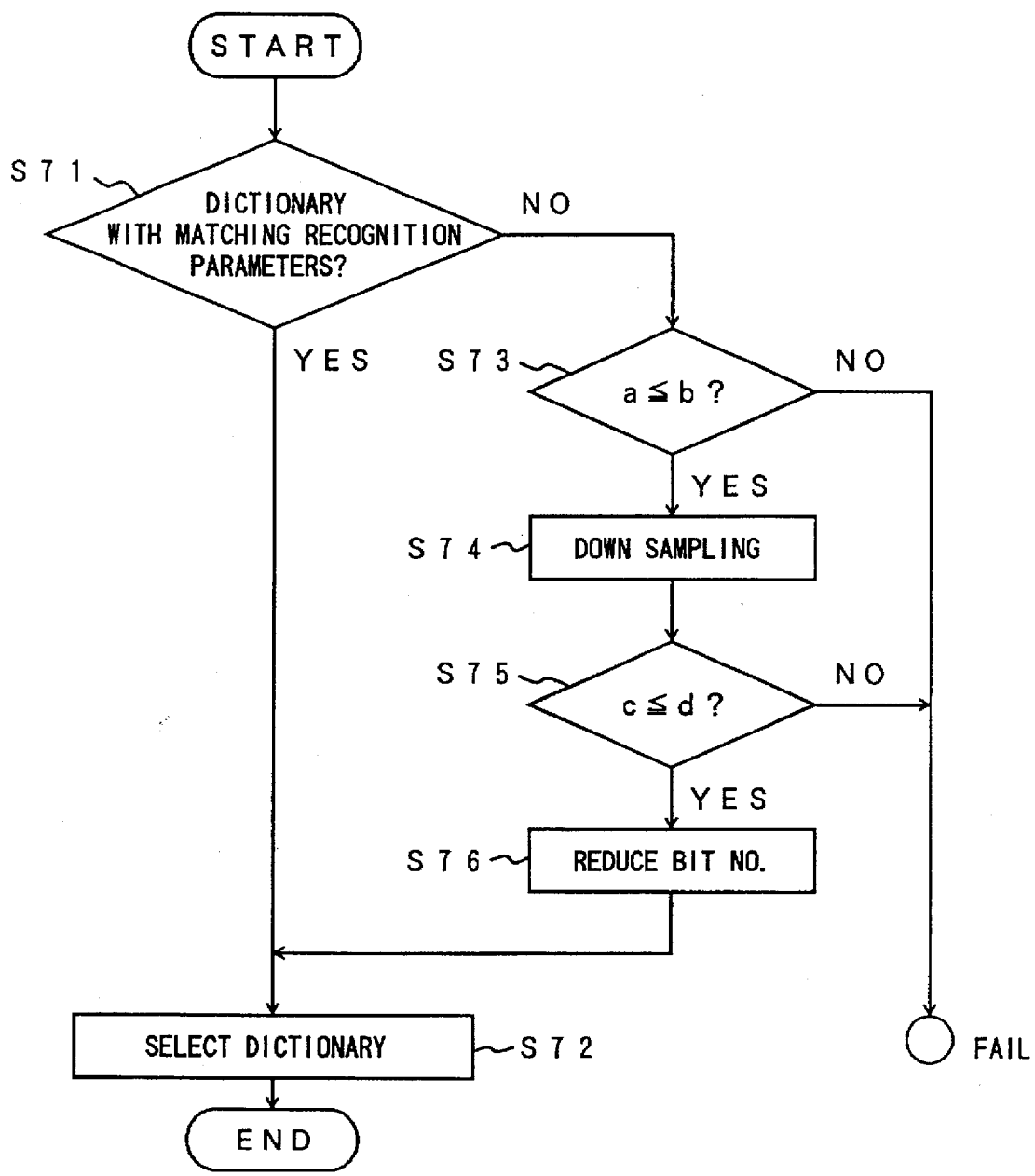
FIG. 24 is a flow chart for explaining the operations of the dictionary selecting means and the recognition parameter setting means of the sixth embodiment in more detail.

FIG. 24 shows a flow chart for explaining the operations of the dictionary selecting means 31 and the recognition parameter setting means 18a in more detail. In FIG. 24, steps S71 and S72 are carried out by the dictionary selecting means. On the other hand, steps S73 through S76 are carried out by the recognition parameter setting means 18a.

In FIG. 71, the step S71 decides whether or not a dictionary 10β-i with recognition parameters all matching those determined by the recognition parameter setting means 18a exists among the dictionaries 10β-i. If the decision result in the step S71 is YES, the step S72 selects the appropriate dictionary 10β-i.

On the other hand, if the decision result in the step S71 is NO, the step S73 decides whether the sampling frequency a of the A/D converter within the speech input means 11a is less than or equal to the sampling frequency b of the recognition parameters. If the decision result in the step S73 is YES, the step S74 carries out the down sampling process described above. In addition, the step S75 decides whether or not the quantization bit number c of the A/D converter within the speech input means 11a is less than or equal to the bit number d of the recognition parameters. If the decision result in the step S75 is YES, the step S76 reduces the bit number, and the process advances to the step S72. On the other hand, it is regarded that the speech recognition is not possible if the decision result in the step S73 or S75 is NO.

Further, the present invention is not limited to these embodiments, but various variations and modifications may be made without departing from the scope of the present invention.

What is claimed is:

1. A speech recognition method which carries out a speech recognition process on an input speech signal based on recognition parameters using recognition software, said speech recognition method comprising the steps of:

(a) detecting at least one running environment provided by hardware which is to run the recognition software;

(b) determining recognition parameters depending on the running environment detected by said step (a); and (c) carrying out the speech recognition process on the input speech signal based on the recognition parameters determined by said step (b) using the recognition software, said recognition parameters determining a quality of the speech recognition process.

2. The speech recognition method as claimed in claim 1, which further comprises the steps of:

(d) extracting feature data of the input speech signal depending on the recognition parameters determined by said step (b), said step (c) carrying out the speech recognition by matching the feature data extracted by said step (d) with feature data registered in one or a plurality of dictionaries.

3. The speech recognition method as claimed in claim 2, which further comprises the steps of:

(e) registering the feature data of the speech signal extracted by said step (d) in the one or plurality of dictionaries depending on the recognition parameters determined by said step (b).

4. The speech recognition method as claimed in claim 2, which further comprises the steps of:
(f) specifying one dictionary out of a plurality of dictionaries, based on the recognition parameters,
said step (c) carrying out the speech recognition by matching the feature data extracted by said step (d) with feature data registered in the dictionary specified by said step (f).

5. The speech recognition method as claimed in claim 2, which further comprises the steps of:
(g) measuring a running time or processing time of a performance measuring program which measures a performance of the hardware by starting the performance measuring program,
said step (b) determining the recognition parameters by taking into consideration the running time or processing time measured by said step (g).

6. The speech recognition method as claimed in claim 2, which further comprises the steps of:
(g) measuring a running time or processing time of a performance measuring program which measures a performance of the hardware by starting the performance measuring program,
said step (d) extracting the feature data of the input speech signal using an analyzing technique that is changed depending on the running time or processing time measured by said step (g).

7. The speech recognition method as claimed in claim 2, which further comprises the steps of:
(h) measuring a time required to extract the feature data of the input speech signal by said step (d),
said step (b) determining the recognition parameters by taking into consideration the time measured by said step (h).

8. The speech recognition method as claimed in claim 2, which further comprises the steps of:
(h) measuring a time required to extract the feature data of the input speech signal by said step (d),
said step (d) extracting the feature data of the input speech signal using an analyzing technique that is changed depending on the time measured by said step (h).

9. The speech recognition method as claimed in claim 1, wherein said step (b) determines the recognition parameters depending on the running environment detected by said step (a) by referring to a conversion table which manages corresponding relationships of running environment values and recognition parameter values.

10. The speech recognition method as claimed in claim 9, wherein said step (b) determines the recognition parameters to be used by said step (c) upon the speech recognition process by carrying out a predetermined operation on a predetermined combination of the recognition parameter values which are specified by the detected running environment values and are read from the conversion table.

11. A speech recognition apparatus which carries out a speech recognition process on an input speech signal based on recognition parameters using recognition software, said speech recognition apparatus comprising:
detecting means for detecting at least one running environment provided by hardware which is to run the recognition software;
determining means, coupled to said detecting means, for determining recognition parameters depending on the running environment detected by said detecting means; and
matching means, coupled to said determining means, for carrying out the speech recognition process on the input speech signal based on the recognition parameters determined by said determining means using the recognition software,
said recognition parameters determining a quality of the speech recognition process.

12. The speech recognition apparatus as claimed in claim 11, which further comprises:
one or a plurality of dictionaries, coupled to said matching means, having feature data registered therein; and
analyzing means, coupled to said determining means, for extracting feature data of the input speech signal depending on the recognition parameters determined by said determining means,
said matching means carrying out the speech recognition by matching the feature data extracted by said analyzing means with feature data registered in said one or plurality of dictionaries.

13. The speech recognition apparatus as claimed in claim 12, which further comprises:
registering means, coupled to said one or plurality of dictionaries, for registering the feature data of the speech signal extracted by said analyzing means in said one or plurality of dictionaries depending on the recognition parameters determined by said determining means.

14. The speech recognition apparatus as claimed in claim 12, which further comprises:
specifying means, coupled to a plurality of dictionaries, for specifying one dictionary out of the plurality of dictionaries based on the recognition parameters,
said matching means carrying out the speech recognition by matching the feature data extracted by said analyzing means with feature data registered in the dictionary specified by said specifying means.

15. The speech recognition apparatus as claimed in claim 12, which further comprises:
measuring means for measuring a running time or processing time of a performance measuring program which measures performance of the hardware by starting the performance measuring program,
said determining means determining the recognition parameters by considering the running time or processing time measured by said measuring means.

16. The speech recognition apparatus as claimed in claim 12, which further comprises:
measuring means for measuring a running time or processing time of a performance measuring program which measures a performance of the hardware by starting the performance measuring program,
said analyzing means extracting the feature data of the input speech signal using an analyzing technique that is changed depending on the running time or processing time measured by said measuring means.

17. The speech recognition apparatus as claimed in claim 12, which further comprises:
measuring means for measuring a time required to extract the feature data of the input speech signal by said analyzing means,
said determining means determining the recognition parameters by considering the time measured by said measuring means.

18. The speech recognition apparatus as claimed in claim 12, which further comprises:

measuring means for measuring a time required to extract the feature data of the input speech signal by said analyzing means, said analyzing means extracting the feature data of the input speech signal using an analyzing technique that is changed depending on the time measured by said measuring means.

19. The speech recognition apparatus as claimed in claim 11, which further comprises:

a conversion table managing corresponding relationships of each of running environment values and each of recognition parameter values, said determining means determining the recognition parameters depending on the running environment detected by said detecting means by referring to said conversion table.

20. The speech recognition apparatus as claimed in claim 19, wherein said determining means determines the recognition parameters to be used by said matching means upon the speech recognition process by carrying out a predetermined operation on a predetermined combination of the recognition parameter values which are specified by the detected running environment values and are read from said conversion table.

21. A storage unit adapted for use on a speech recognition apparatus which carries out a speech recognition process on an input speech signal based on recognition parameters using recognition software, said speech recognition apparatus comprising:

detecting means for detecting at least one running environment provided by hardware which is to run the recognition software;

determining means, coupled to said detecting means, for determining recognition parameters depending on the running environment detected by said detecting means; and matching means, coupled to said determining means, for carrying out the speech recognition process on the input speech signal based on the recognition parameters determined by said determining means using the recognition software, said storage unit comprising:

values of running environments defined as running environment values;

values of recognition parameters defined as recognition parameter values; and a conversion table managing corresponding relationships of each of the running environment values and each of the recognition parameter values, so that said determining means determines the recognition parameters depending on the running environment detected by said detecting means by referring to said conversion table, said recognition parameters determining a quality of the speech recognition process.

22. The storage unit as claimed in claim 21, wherein the recognition software is stored together with said conversion table.

23. The storage unit as claimed in claim 22, which further comprises:

one or a plurality of dictionaries having registered feature data stored with said conversion table.

24. The storage unit as claimed in claim 22, which further comprises:

a plurality of dictionaries having registered feature data stored with said conversion table, said plurality of dictionaries respectively having recognition parameter dependent registered feature data.

\* \* \* \* \*